United States Patent
von Gonten et al.

(10) Patent No.: US 7,319,972 B2
(45) Date of Patent: Jan. 15, 2008

(54) SYSTEMS AND METHODS FOR MODELING PRODUCT PENETRATION AND REPEAT

(75) Inventors: Michael F. von Gonten, Delray Beach, FL (US); Paul F. Muller, Shorewood, MN (US)

(73) Assignee: Michael von Gonten, Inc., Delray Beach, FL (US)

( * ) Notice: Subject to any disclaimer, the term of this patent is extended or adjusted under 35 U.S.C. 154(b) by 1283 days.

(21) Appl. No.: 10/315,744

(22) Filed: Dec. 10, 2002

(65) Prior Publication Data

US 2003/0065555 A1 Apr. 3, 2003

Related U.S. Application Data

(63) Continuation-in-part of application No. 09/550,574, filed on Apr. 17, 2000, now Pat. No. 6,708,156.

(51) Int. Cl.
*G06Q 10/00* (2006.01)
(52) U.S. Cl. .............................. 705/10; 705/7
(58) Field of Classification Search .................. 705/7, 705/10
See application file for complete search history.

(56) References Cited

U.S. PATENT DOCUMENTS

| | | | |
|---|---|---|---|
| 5,299,115 A * | 3/1994 | Fields et al. .................. 705/10 |
| 5,375,201 A * | 12/1994 | Davoust ..................... 715/503 |
| 5,377,095 A | 12/1994 | Maeda et al. ................. 705/10 |
| 5,459,656 A | 10/1995 | Fields et al. ................. 700/104 |
| 5,461,699 A * | 10/1995 | Arbabi et al. ................. 706/21 |
| 5,615,109 A * | 3/1997 | Eder .............................. 705/8 |
| 5,712,985 A * | 1/1998 | Lee et al. ....................... 705/7 |

(Continued)

FOREIGN PATENT DOCUMENTS

JP 410143490 A * 5/1998

(Continued)

OTHER PUBLICATIONS

Walker et al., "Why liking matters.", Journal of Advertising, May-Jun./1994 [retrieved Aug. 15, 2002], vol. 34, No. 3, 13 pages, retrieved from: Dialog, file 148.*

(Continued)

*Primary Examiner*—Tariq R. Hafiz
*Assistant Examiner*—Jonathan G Sterrett
(74) *Attorney, Agent, or Firm*—Brooks, Cameron & Huebsch, PLLC

(57) ABSTRACT

Methods, devices and systems are provided for modeling product volume penetration. A system embodiment includes a remote client operably connected to a server, having a number of client files, and an input device. A set of computer executable instructions are operable on the system for projecting product penetration of a product in a client file at a selectable point in time from a product launch or other starting point, based on a set of purchase data for the product. The set of computer executable instructions are operable for receiving the set of purchase data and graphically displaying the set of purchase data as a volume of product sales versus a number of time increments from the starting point. The set of computer executable instructions are further operable for mapping a curvilinear function to the graphically displayed set of purchase data by applying a function expressed as $f(t)=s \times t^B$.

29 Claims, 15 Drawing Sheets

U.S. PATENT DOCUMENTS

| | | | | |
|---|---|---|---|---|
| 6,029,139 | A | 2/2000 | Cunningham et al. | 705/10 |
| 6,032,125 | A | 2/2000 | Ando | 705/10 |
| 6,078,893 | A | 6/2000 | Ouimet et al. | 705/1 |
| 6,321,205 | B1 | 11/2001 | Eder | 705/40 |
| 6,366,890 | B1 * | 4/2002 | Usrey | 705/10 |
| 6,401,070 | B1 * | 6/2002 | McManus et al. | 705/1 |

FOREIGN PATENT DOCUMENTS

| | | |
|---|---|---|
| JP | 10307808 A * | 11/1998 |

OTHER PUBLICATIONS

Forst, Frank G., "Forecasting Restaurant Sales Using Multiple Regression and Box-Jenkins Analysis", Journal of Applied Business Research, Spring 1992 [retrieved-Aug. 15, 2002], vol. 8, No. 2, 4 pages, retrieved from: Dialog, 15.*

"Marketplace Worldwide", www.,moonhoney.com, [retrieved Aug. 2, 2002], 3 pages, Retrieved from: Google.com.*

Ephron et al., "Media Scheduling and Carry-over effects", www.ephrononmedia.com, Jul./Aug. 2002 [retrieved on Jan. 31, 2003], 10 pages, retrieved from: Google.com.*

Morrison, Jeffrey S., "Life-cycle approach to new product forecasting", The Journal of Business Forecasting Methods and Systems, Summer 1995 [retrieved Aug. 27, 2002], vol. 14, Issue 2, 3 pages, Retrieved from: Proquest.*

Mahajan et al., "When is it worthwhile targeting the majority instead of the innovators in a new product launch", JMR, Nov. 1998 [retrieved Aug. 27, 2002-Jan. 31, 2003], vol. 35, Issue 4, 20 pages, retrieved from: Proquest Direct.*

Donius, James F., "Market Tracking: A Strategic Reassessment and Planning Tool", *Journal of Advertising Research 25 (1)*, Feb./Mar. (1985).

Donius, James F., Campaign Simulation via Multiple Exposure, *Journal of Advertising Research 23 (2)*, Apr./May (1983).

Ephron, E., "More week, Less Weight: The Shelf-Space Model of Advertising", *Journal of Advertising Research*, 35 (3), pp. 18-23, (1995).

Howard, John A. *Buyer Behavior in Marketing Strategy 2nd Ed.*, Prentice Hall pp. 41-48 and 365-382 (1994).

Jones, J.P. *When Ads Work: New Proof that Advertising Triggers Sales*, Lexington Boos, A Division of Simon & Schuster Inc., New York, NY, pp. 1-240, (1995).

Longman, Kenneth A. "If not effective frequency, then what?", *Journal of Advertising Research 37 (4)*, Jul./Aug. 1997.

McDonald, C., *Advertising Reach and Frequency: Maximizing Advertising Results Through Effective Frequency, Second Edition*, NTC Business Books, a division of NTC Publishing Group, Lincolnwood, IL, pp. 1-157, (1996).

Naples, M.J., *Effective Frequency: The Relationship Between Frequency and Advertising Effectiveness*, Association of National Advertisers, Ner York, NY, pp. 1-140, (1979).

von Gonten, M.F., et al., "Advertising Exposure and Advertising Effects: New Panel-based Findings", *Journal of Advertising Research*, 37 (4), pp. 51-60 (1997).

* cited by examiner

SYSTEMS AND METHODS FOR MODELING PRODUCT PENETRATION AND REPEAT This application is a Continuation-in-Part of U.S. application Ser. No. 09/550,574, filed Apr. 17, 2000, now U.S. Pat. No. 6,708,156, the specification of which is herein incorporated by reference.

FIELD OF THE INVENTION

The present invention relates generally to the field of economics. More particularly, the present invention relates to a system and a method for modeling product penetration and evaluating advertising and promotional impact.

BACKGROUND

For more than twenty years, the planning and buying of television advertising has been based on the concept of effective frequency. A compilation of research is provided in *Effective Frequency: The Relationship Between Frequency and Advertising Effectiveness*, by Mike Naples (1979) recently updated by Colin McDonald (1996). A key concept set forth in the book is that a single exposure is not enough to create a desired sales effect; most media planning models assume an effective frequency of three. In part based on this concept, a majority of television media plans are "flighted", that is, weeks of dense exposure are followed by weeks off-air. Off-air weeks are necessitated by the cost of acquiring enough air time to provide for an effective frequency of three at whatever level of reach is desired. The belief in effective frequency causes advertisers to plan to be off-air rather than expose their advertising at frequency levels below the targeted three.

Over the last several years a number of publications have changed the perception of effective frequency. The works of John Philip Jones, particularly *When Ads Work* (1995), are seminal to the changes taking place in the concept of effective frequency. Using single-source data and a share-based analytical scheme, Jones has examined purchases within one week of ad exposure, finding that a single exposure within that time period produces the majority of the positive share effect. While additional exposures beyond the first produce small gains, Jones concludes that effective frequency is in fact one, and that continuity of airing, rather than flighting, should be the advertiser's goal.

Expanding on the work of Jones, Ephron (1995) draws media conclusions that (weekly) reach should be the planning and buying criteria, and that being off-air, as required by the flighting pattern, is equivalent to being out-of-stock at the point of sale. Ephron uses a concept of recency to explain the manner in which a single exposure of advertising works. He postulates that there are a pool of "this week's buyers" which may be affected by the advertising which airs this week, plus a pool of "next week's buyers" which may be affected by next week's airings, but which are unaffected by this week's advertising exposures, and so on forward in time. Thus continuity of exposure is rewarded, and off-air weeks (which result from flighting to gain frequency of exposure greater than one on the air), penalize a product.

These publications illustrate that the study of advertising marketing effects on a products' sales performance is an important area of study and concern for product manufacturers. First time buyers due to advertising are likely to be repeat buyers.

FIG. 4 provides an example of a study of advertising activity. Referring to FIG. 4, a chart is shown. The chart above shows an objective measure of the level of temporary price reduction (TPR) activity, measured in percent % of All Commodity Volume, a measure which weights large and small stores by the volume of all goods sold. Weeks designated by a bulls eye were counted as promotion weeks (Prom. Period). Weeks designated by a bullet were counted as non-promotional weeks.

Unfortunately, to get a true evaluation of the effectiveness of any advertising campaign a baseline must be known which represents what the expected sales for a particular product would have been absent the advertising promotion. To attempt to model the same, companies/manufacturers look to numerous consumer polling groups for information in order to approximate what the expected value of these data points would be, e.g. to understand the effectiveness of an advertising campaign.

For example, AC Nielsen, Inc., and Information Resources, Inc. (IRI) work in the area of modeling advertising effects. Media Marketing Assessment (MMA), Hudson River Group and Millward/Brown also work in this area. These entities utilize aggregate data plugged into extremely complex equations having forty to fifty parameters. Perhaps seventy to eighty estimates are made to aggregate back to the national estimate cumulating data. From this sort of convoluted data manipulation, these groups offer their analyses.

For example, Bases, which is presently a division of AC Nielsen, Inc., provides forecasting, or market sales volume simulation, for new products. The Bases' processes, however, are anchored in a 52 week market, and cannot provide information prior to or beyond the 52 week expected picture or prediction.

AC Nielsen and IRI have modeling groups and access to raw data, and still do not make use of it. These and other modelers of consumer data use aggregate data instead with extremely complex equations having 40-50 parameters. They work with data at the level of a retail chain. They require 70-80 estimates to aggregate back to national estimate cumulating data. The less that data is, or must be, manipulated the more accurate in character that data. Therefore, less manipulated data would be more useful and accurate in providing evaluations, forecasts or expected future performance of a product.

Prior art methods have about fifty parameters to estimate and require regression based adjustment that may independently effect the values of each data point, thereby making the analysis of the data less reliable. These, conventional modeling methods do not isolate week by week data within a given class of products and thus are not able to provide a true week by week analysis, but instead provide only a more generalized picture at 52 weeks.

For the reasons stated above, and for other reasons stated below which will become apparent to those skilled in the art upon reading and understanding the present specification, it is desirable to develop systems and methods which can afford greater flexibility in analyzing advertising effects, and more timely forecasting and analysis of advertising exposure and expected future performance for product sales, in a manner which minimizes the manipulation of data and provides greater accuracy.

SUMMARY OF THE INVENTION

The above mentioned problems associated with modeling and analysis of advertising effects and other problems are addressed by the present invention and will be understood by reading and studying the following specification. Systems and methods are described which afford organizations greater flexibility and accuracy in analyzing effects of their current advertising, and better forecasting and implementation of proposed strategies and advertising changes.

One embodiment of the present invention is a modeling process which can be used to isolate and document marketing and advertising effects of any kind, including effects having either a short-term or long-term nature. For example, the process can also be used to monitor or forecast advertising effects. In addition, the process can be used to simulate a test market for a product. In various embodiments, the modeling process uses household panel data. The present invention provides a method for predicting expected sales volume. The three components of: market sales volume, market penetration (the first purchase of a product for each household), first repeat (the second purchase for each household) and depth of repeat (third and later purchases for each household) can be modeled and forecast, or predicted, based on actual purchase data and/or consumer response data from a simulated test market. These components can also be utilized to review and analyze the past performance of the product.

In one embodiment, a system for modeling product penetration is provided. The system includes a server. The server includes a database having a number of client files. Each client file is an organized client data file including data for a number of products. The organized data file includes a number of linked web pages which are displayable on a remote client having a graphical user interface. The remote client is operably connected to the server. An input device is operably connected to the remote client. At least one of the number of linked web pages includes a data field for entering a parameter for an analysis of a client file. A set of computer executable instructions are operable on the system for modeling and projecting product penetration of a product in a client file at a selectable point in time from the starting point of the analysis (for example, the product launch date is one such suitable starting point), based on a set of purchase data for the product. As one of ordinary skill in the art will understand, the data analysis can begin at any point where data has been taken and, accordingly, any starting point can be utilized. In various embodiments, the set of computer executable instructions are operable for receiving the set of purchase data. In the various embodiments, the set of purchase data includes information on incremental product repeat purchases, on incremental product penetration purchases, and on total incremental product purchase occasions.

The set of computer executable instructions are operable for graphically displaying the information on incremental product repeat purchases, the information on incremental product penetration purchases, and the information on total incremental product purchase occasions as data points representing a volume of incremental product repeat purchases, incremental product penetration purchases, and total incremental product purchase occasions measured on a first axis versus a t value (time) measured on a second axis.

The set of computer executable instructions include instructions for mapping a curvilinear function f(t) to the graphically displayed set of purchase data by applying a probability distribution function. In the various embodiments of the invention, the instructions are operable to apply a function expressed according to $f(t)=s \times t^B$ or $f(t)=s \times (m+t)^B$. In various embodiments of the invention, a t value represents time increments measured from a starting point. In the various embodiments, a B value is a selectable value associated with a product purchase cycle.

As one of ordinary skill in the art will appreciate upon reading and understanding this disclosure, such a mapped curvilinear function, performed according to the set of computer executable instructions described herein, will provide a robust match to the received set of purchase data with considerable fidelity. Accordingly, the mapped curvilinear function can be used to forecast, or predict, future expected market sales volume at a later point in time with a high degree of accuracy. This is useful in analyzing the state of a business. Additionally, the mapped curvilinear function can be used to analyze and assess the efficacy of marketing in comparison to what an expected market sales volume would have been with no promotional or advertising activity.

Prior art methods have about fifty parameters to estimate, and require regression based adjustments, that may encompass individually altering every single data point in a data set, to perform such forecast, or prediction, simulations. The present systems and methods remove the necessity of adjustment. The less adjusted data used in the systems and methods of the present invention provide more accurate simulations. And, the absence of adjustment is beneficial to the quality of the data. The present model does not adjust or damage data. It utilizes raw data with fewer simpler parameters. The data are therefore more robust.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
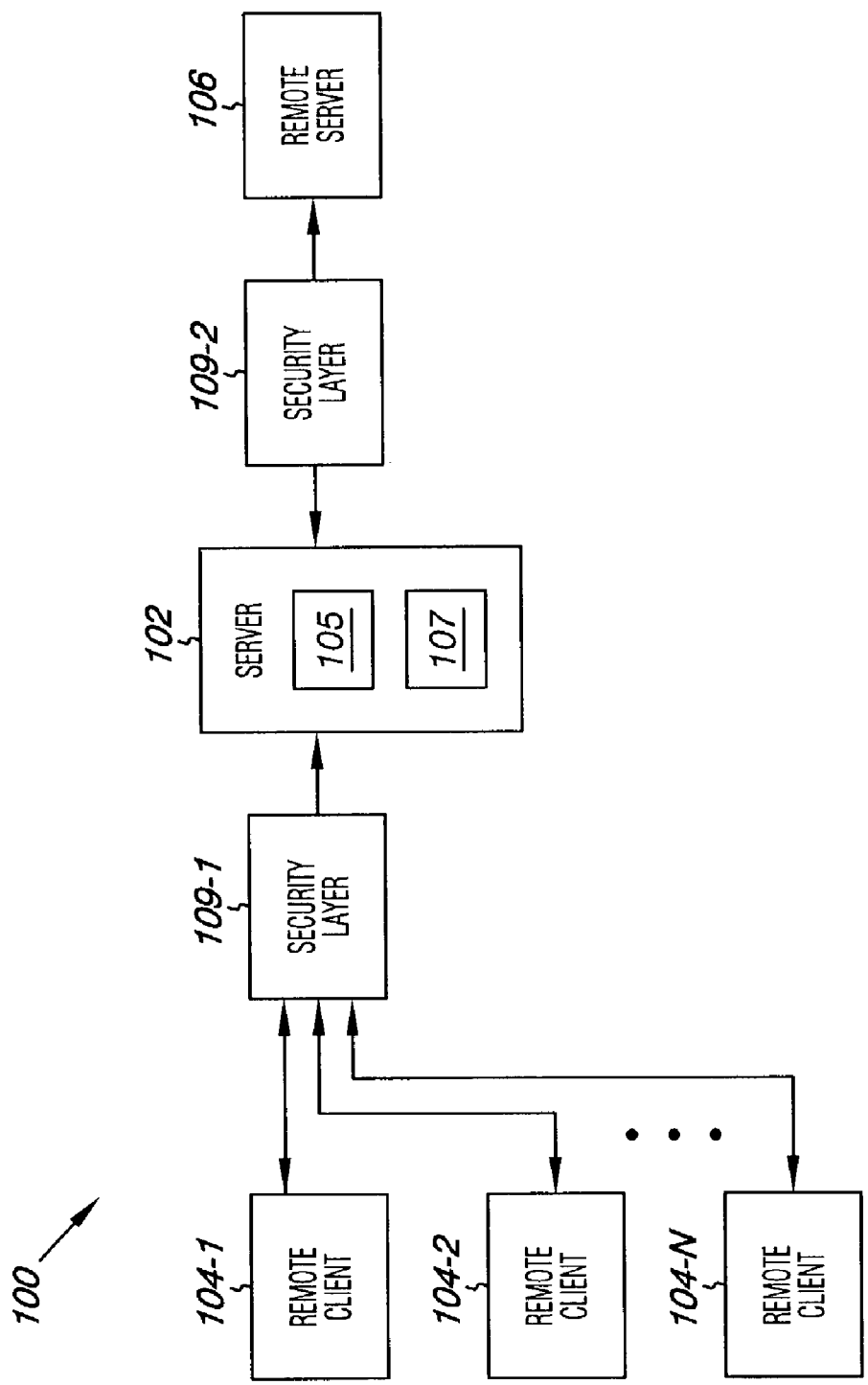
FIG. 1 is an illustration of a system according to the teachings of the present invention.

FIG. 1 is an illustration of a system 100 according to the teachings of the present invention. In one embodiment, the system 100 includes an Internet network system 100. In FIG. 1, the system 100 includes a server 102. Server 102 includes a processor 105 coupled to a data storage device 107. The system 100 further includes one or a number of remote clients 104-1, 104-2, . . . , 104-N each including a client program, or software means, which is operatively or communicatively coupled to the server 102. In one embodiment, the number of remote clients 104-1, 104-2, . . . , 104-N are operatively coupled to the server 102 through a first security layer 109-1, or secure data network 109-1. In another embodiment, the number of remote clients 104-1, 104-2, . . . , 104-N such as particular client product manufacturers, each including a client program, or software means, include software which provide security at the number of remote clients 104-1, 104-2, . . . , 104-N. In one embodiment the number of remote clients 104-1, 104-2, . . . , 104-N is coupled to the server 102 over a local area network (LAN), e.g. an Ethernet network. In an alternative embodiment, the number of remote clients 104-1, 104-2, . . . , 104-N is coupled to the server 102 over a wide area network (WAN). Also, the number of remote clients 104-1, 104-2, . . . , 104-N can be coupled to the server 102 over the public switched telephone network (PSTN) and/or the Internet. In one embodiment, by way of example and not by way of limitation, the number of remote clients 104-1, 104-2, . . . , 104-N can communicate with one another and the server 102 using transmission control protocol/Internet protocol (TCP/IP).

The system 100 can further include coupling, as described above to additional servers and systems 106, such as servers and systems 106 maintained by other organizations, or a mainframe computer. Such systems are known and understood by one of ordinary skill in the art. In one embodiment, the additional servers and systems 106 or mainframe computer include core databases accessible by the server 102. In one embodiment, the servers and systems include servers and systems maintained by third party market pooling groups such as A. C. Nielsen and MMA. For example, the additional servers and systems 106 or mainframe computer can include databases and executable instructions which operate on the file data of third party or outside organizations and/or possess PSTN processing and routing capabilities. In one embodiment, the additional servers and systems 106 include proprietary databases and data modules maintained by third party or outside organizations. In one embodiment, the additional servers and systems 106 are similarly coupled to the server 102 through a second security layer 109-2, or secure data network 109-2 such that file data from the additional servers and systems 106 can be exported to server 102. In one embodiment, the additional servers and systems 106 are coupled to the server 102 over a local area network (LAN), e.g. an Ethernet network. In an alternative embodiment, the additional servers and systems 106 are coupled to the server 102 over a wide area network (WAN). Also the additional servers and systems 106 can be coupled to the server 102 over the public switched telephone network (PSTN) and/or the Internet. In one embodiment, by way of example and not by way of limitation, the additional servers and systems 106 can communicate with one another and the server 102 using transmission control protocol/Internet protocol (TCP/IP).

The server 102 can be coupled to third party or outside organizations and the additional servers and systems 106 in a direct hardwired fashion, e.g. hybrid fiber-coax connection and/or indirectly in a wireless fashion using remote electromagnetic signal transmission in the radio or microwave frequencies.

In FIG. 1, the server 102, the number of remote clients 104-1, 104-2, . . . , 104-N, and the additional servers and systems 106 all include computer readable medium having computer-executable instructions. These computer readable medium include such devices as a disk drive for reading data storage media, e.g. a compact disc, and/or computer readable medium such as random access memory (RAM) and read only memory (ROM). Similarly, the server 102, the number of remote clients 104-1, 104-2, . . . , 104-N, and the additional servers and systems 106 can all include a processor coupled to a data storage device.

Figure 2:
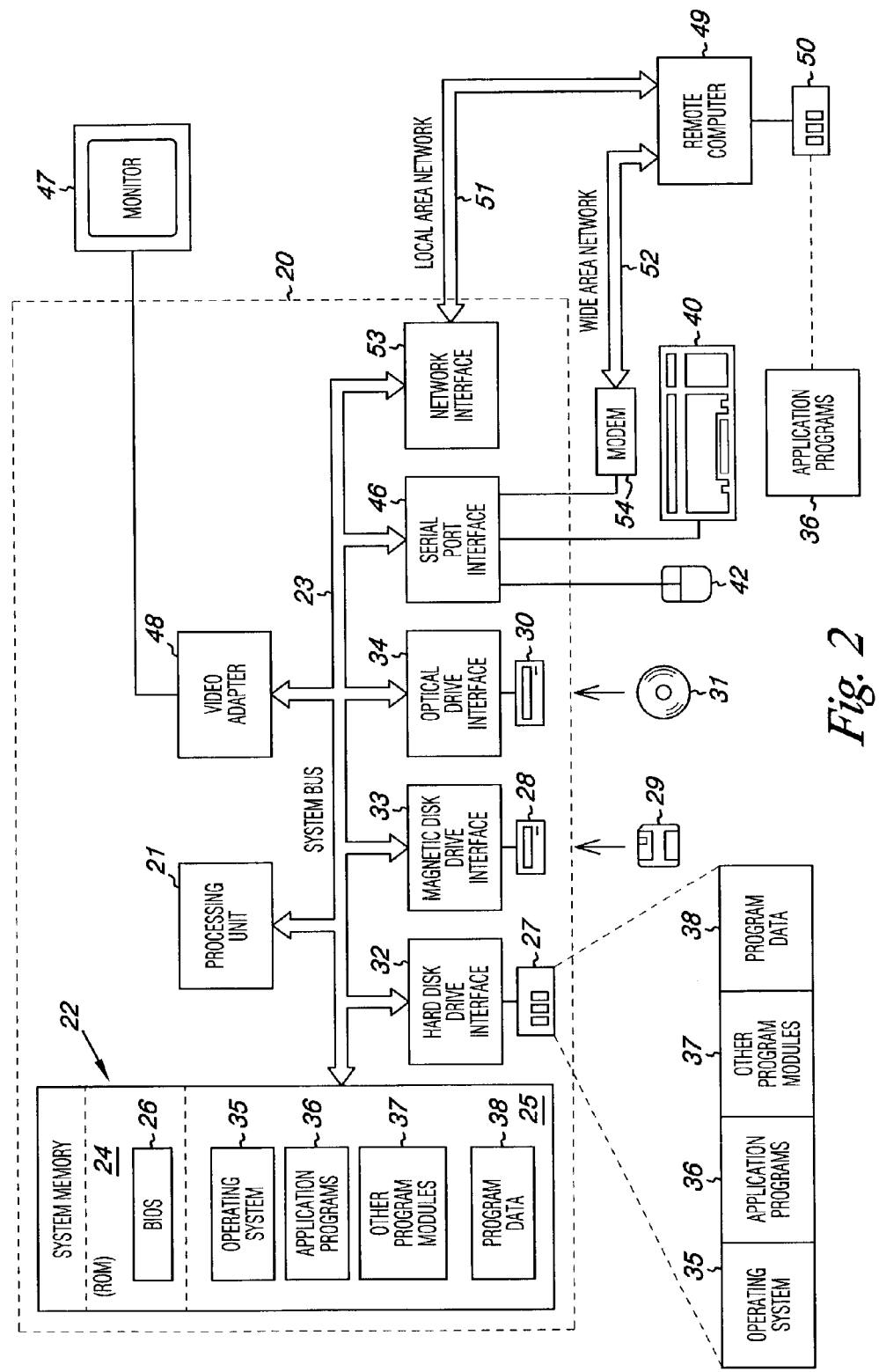
FIG. 2 is a diagram of a hardware and operating environment in conjunction with which embodiments of the invention may be practiced.

FIG. 2 is a diagram of a hardware and operating environment in conjunction with which embodiments of the invention may be practiced for the server 102, the number of remote clients 104-1, 104-2, . . . , 104-N, and the additional servers and systems 106 from FIG. 1. The description of FIG. 2 is intended to provide a brief, general description of suitable computer hardware and a suitable computing environment in conjunction with which the invention may be implemented. The invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multi processor systems, microprocessor-based or programmable consumer electronics, network PCS, minicomputers, mainframe computers, and the like. The invention may also be practiced in distributed computer environments where tasks are performed by remote processing devices that are linked through a communications network. In a distributed computing environment, program modules may be located in both local and remote memory storage devices.

In the embodiment shown in FIG. 2, the hardware and operating environment of the server 102, the remote client 104, and/or the additional servers and systems 106 from FIG. 1 includes a general purpose computing device in the form of a personal computer 20, or a server 20, including a processing unit 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 can be any of several types of bus structures including a memory bus or memory controller, a peripheral bus, and a local bus using any of a variety of bus architectures. The system memory can also be referred to as simply the memory, and includes read only memory (ROM) 24 and random access memory (RAM) 25. A basic input/output system (BIOS) 26, containing the basic routines that help to transfer information between elements within the computer 20, or a server 20, such as during start-up, may be stored in ROM 24. The computer 20, or a server 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20, or a server 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, can be used in the exemplary operating environment.

A number of program modules can be stored on the hard disk, magnetic disk 29, optical disk 31, ROM 24, or RAM 25, including an operating system 35, one or more application programs 36, other program modules 37, and program data 38. A plug in containing a search engine for the present invention can be resident on any one or number of these computer-readable media.

A user may enter commands and information into the personal computer 20, or server 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

As explained in connection with FIG. 1, the computer 20, or server 20 may operate in a networked environment using logical connections to one or more remote computers or servers, such as remote computer 49. These logical connections are achieved by a communication device coupled to or a part of the computer 20, or server 20; the invention is not limited to a particular type of communications device. The remote computer 49 can be another computer, a server, a router, a network PC, a client, a peer device or other common network node, and typically includes many or all of the elements described above relative to the computer 20, or server 20, although only a memory storage device 50 has been illustrated in FIG. 2. The logical connections depicted in FIG. 2 include a local area network (LAN) 51 and a wide area network (WAN) 52. Such networking environments are commonplace in office networks, enterprise-wide computer networks, intranets and the Internet, which are all types of networks.

When used in a LAN-networking environment, the computer 20, or server 20, is connected to the LAN 51 through a network interface or adapter 53, which is one type of communications device. When used in a WAN-networking environment, the computer 20, or server 20, typically includes a modem 54, a type of communications device, or any other type of communications device, e.g. a wireless transceiver, for establishing communications over the wide area network 52, such as the Internet; the invention is not so limited. The modem 54, which may be internal or external, is connected to the system bus 23 via the serial port interface 46. In a networked environment, program modules depicted relative to the personal computer 20, or portions thereof, can be stored in the remote memory storage device 50 of remote computer, or server 49. It is appreciated that the network connections shown are exemplary and other means of and communications devices for establishing a communications link between the computers may be used.

The hardware and operating environment in conjunction with which embodiments of the invention may be practiced has been described. The computer 20, or server 20, in conjunction with which embodiments of the invention can be practiced can be a conventional computer, a distributed computer, or any other type of computer; the invention is not so limited. Such a computer 20, or server 20, typically includes one or more processing units as its processor, and a computer-readable medium such as a memory. The computer 20, or server 20, can also include a communications device such as a network adapter or a modem, so that it is able to communicatively couple to other computers, servers, or devices.

Figure 3:
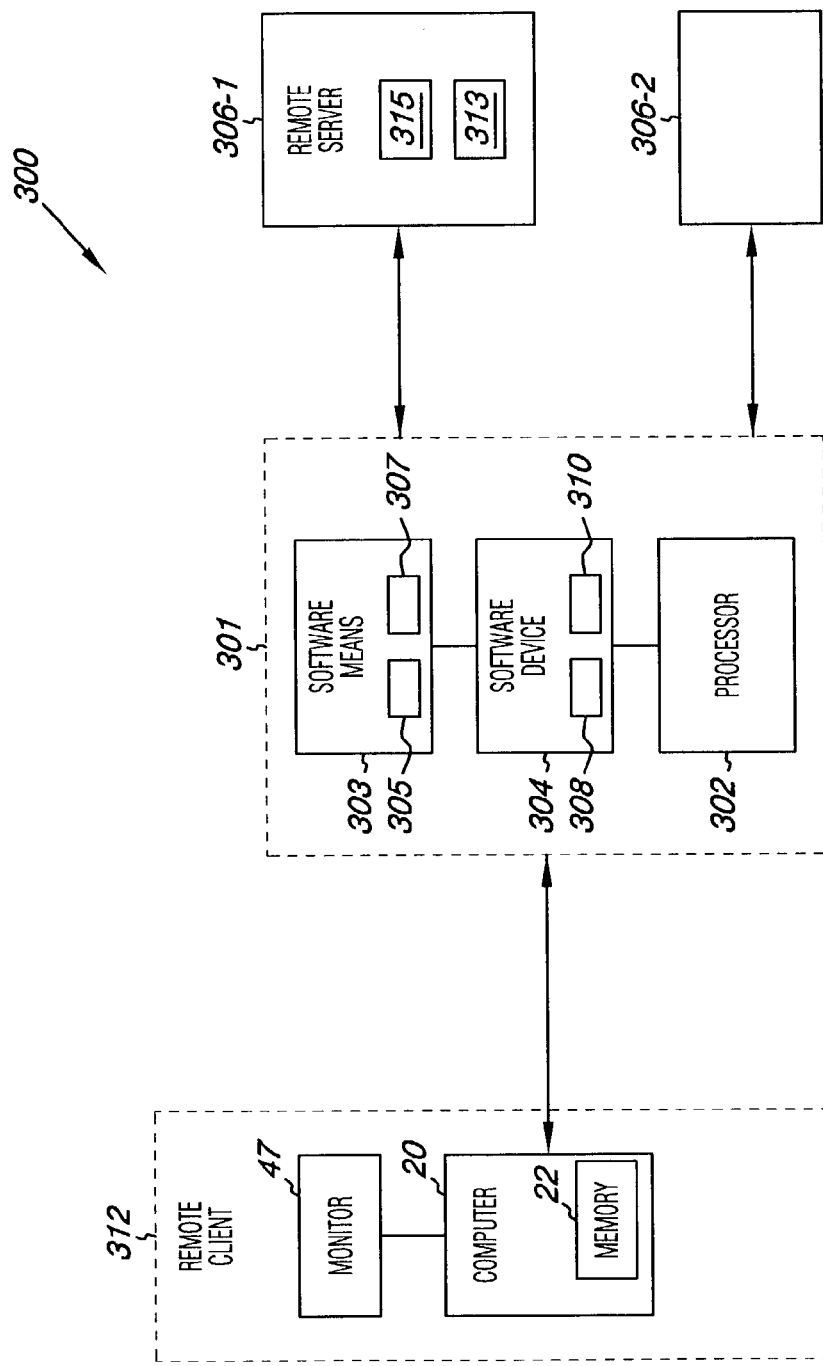
FIG. 3 is a more detailed diagram of the system of FIG. 1 according to the teachings of the present invention.

FIG. 3 is a more detailed diagram of the system 100 interaction of FIG. 1 according to the teachings of the present invention. In FIG. 3, the system 300 includes server 301. The server 301 in the system 300 includes a processor 302 coupled to a storage device 304. The system further includes software means 303 operative on the processor 302, the remote client 312 having a client program, and the additional servers and systems 306-1, 306-2, etc., to perform methods according to the teachings of the present invention. The software means 303 includes a novel software program, including interface protocols, application programs, and program modules for carrying out the methods of the present invention. According to the teachings of the present invention, the software means 303 includes an analysis module 305 suitable for retrieving market sales data from outside servers 306-1, 306-2 and performing analyses on this sales data for any of a number of client data files. Also, according to the teachings of the present invention, the software means 303 includes a filter module 307 suitable for organizing the retrieved sales data for a particular client into a customizable client data file accessible to a remote client over the Internet. According to the teachings of the present invention, the filter module 307 and the analysis module 305 contain application programs, and/or make up portions of application programs, which can be stored in the storage device. Similarly, the organized, customizable client data file can be stored in storage device 304 on server 301. The novel software means 303 according to the teachings of the present invention can be executed on system 300. The software means 303 can be resident on the server as shown in FIG. 3, or alternatively, the software means 303 can be resident on any number of the storage devices, e.g. computer readable medium, coupled in system 300. One of ordinary skill in the art will understand the manner in which software means 303 can be launched from a computer readable medium in a computer based system to execute the functions defined in the software program. One of ordinary skill in the art will further understand the various programming languages which may be employed to create a software program designed to implement and perform the methods of the present invention. In one embodiment, much of the application software is implemented using object oriented programming, hyper-text mark-up language (HTML) and the like. However, the teachings of the present invention are not limited to a system using object oriented programming and no embodiment of the invention is limited to a particular programming language or environment.

System 300 facilitates advertising effect modeling services for any number of organizational clients. Server 301 includes a database, or first database 308 having a set of resident data in various data structures, e.g. the pooled panel sales data. In one embodiment, the server includes another database, or second database 310, having a number of linked web pages or screen displays 310 in the storage device which are downloadable and displayable to a client program at a remote client 312 having a graphical user interface, e.g. computer 20 and monitor 47. The web pages can be pages that are displayable and down loadable to the client, i.e. to see and save the analysis on their marketing advertising effects. In one embodiment of FIG. 3, the database 308 in server 301 includes a database of a number of client files, e.g. the organized, customizable client data files having the sales data for the particular client organized therein. The number of linked web pages 310 can be used to download and display the analysis performed according to the methods of the present invention to the remote client 312 having a graphical user interface. In one embodiment, as will be understood by one of ordinary skill in the art upon reading this disclosure, each client file can be organized by particular product classes and include a number of different or similar client data files. In one embodiment, by way of illustration and not by way of limitation, each client file is an organized system data file including panel data particular to the client and client's products. For example, in one embodiment, a client file can include an organized system data file including an advertising and a sales history of a specific product or product line for a client. Similarly, the client file can include a number of data fields particular to a given industry or organization.

In operation the analysis module 305 suitable for retrieving market sales data from outside servers 306-1, 306-2 and performing analyses on this sales data for any of a number of client data files recognizes and accounts for any optional features, e.g. such as particular components of the client's sales volume when performing analyses on the client data file. In other words, the software means 303 can address particular components in performing any simulation or analysis on a given data file.

Referring to FIG. 3, in one embodiment, the number of linked web pages or screen displays 310 in the storage device 304 of server 302 includes at least one web page/website, or first web page, which displays a market sales volume curve generated in performing an analysis of a client file using the analysis module 305. Examples of these curves for one embodiment of the present invention are provided in FIGS. 5-7 and are explained ill more detail below.

According to the teachings of the present invention, the analysis module 305 is operable on the organized client data files, and can be instructed with computer-executable instructions, e.g. from the remote client, to perform analyses on the various market sales volume components which are included in the composition of a particular client file.

According to the teachings of the present invention, the software means 303 operable on the server 301 and the client program at the remote client 312 provides for instructing the analysis module 305 to retrieve specific sales data from remote servers 306-1, 306-2, etc. or from an organized client data file. The software means 303 operable on the server 301 and the client program at the remote client 312 is further operable for instructing the analysis module to perform analyses using the sales data to provide simulations for a new product and/or predicted or continued performance relating to specific components of the client's market sales volume for an existing product. Thus, in one embodiment, the software means 303 of the present invention is operable for providing a remote client 312 more accurate and efficient simulations for new product releases. Additionally, in one embodiment, the software means 303 of the present invention is operable for providing a remote client 312 with a more accurate analysis of the impact of advertising marketing effects for the individual components of the client's market sales volume, e.g. penetration, first repeat, and depth of repeat, in a particular product class or category.

As mentioned above, the server 301 can further include a filter module 307. The software means 303 operable on the server 301 and the client program at the remote client 312 is further operable on the filter module 307. The filter module 307 and software means 303 are operable for retrieving and/or electronically receiving sales data for a specific remote client 312 from the remote servers 306-1, 306-2, etc., and organizing the same into an organized client data file for that client. Such sales data can be electronically transmitted, such as received on-line over the Internet, or received in any other storage medium, e.g. magnetic disk or CD.

In one embodiment, the software means 303, e.g. the analysis module 305, is operable for performing a market penetration analysis. That is, the analysis module receives sales data from the third party organization relating to a first time purchase of a particular client product over a number of sales time increments from the product launch, or other starting point, as well as data representing marketing time increments for the product. As used in this application, marketing time increments can include increments in which the client manufacturers ran advertising, offered coupon drops or the product was subject to a temporary price reduction (TPR), etc.

In one embodiment, the software means 303 operable on system 300 is further operable on the server 301, the client program at the remote client 312, and the additional servers and systems, e.g. 306-1, 306-2, etc., for comparing predicted results provided by the analysis method of the present invention for a particular client file in server 301 against those of a third party's or outside organization's analyses, and/or those third party's or outside organization's formulations for new marketing strategies.

According to the teachings of the present invention, the invention can include a computer readable medium, e.g. memory 22 and/or storage device 304, having computer executable instructions to cause a computer, e.g. remote client 312, server 301, and additional servers and systems 306-1, 306-2, . . . , 306-N, to perform methods which include accessing on-line a server database, e.g. storage device 304, which has a number of client files. Each client file is an organized system data file, e.g. a customizable, organized client file including product sales information, which is downloadable and displayable to a client program at the remote client 312 and can be operated upon by the analysis module 305. Each client file can contain a number of organized system data files for a given client. In various embodiments, the methods include inputting data into the client program at the remote client 312 for use by the analysis module 305 in performing an analysis on a portion or portions of a particular client file. The methods can further include using the analysis module 305 for a simulation using the client's organized system data file, and offering projected evaluations on components of the client's market sales volume for a new product release in any specific future time increment or point in time.

In one embodiment, by way of example and not by way of limitation, the computer readable medium, e.g. memory 22 and/or storage device 304, having computer executable instructions includes instruction for causing a computer, e.g. remote client 312, server 301, and additional servers and systems 306-1, 306-2, . . . , 306-N, to perform methods of maintaining a server database which has a number of client files. As described above, each client file is an organized system data file, e.g. a customizable, organized client file including client data, which is downloadable and displayable to a client program at a remote client 312.

In various embodiments, the methods include using the filter module 307 and the analysis module 305 for setting up a base case using the organized system data file. The methods can further include using the analysis module 305 for inputting data using the software means, retrieving data (for example retrieving sales data on a new and existing products/product lines and entering the same into a client's organized data file), retrieving a slope term, and instructing the software means 303 to input a predetermined value for the degree of belly term (B) based on the particular component of a client's sales volume that is being analyzed for use by the analysis module 305 on a particular client file. For example, if a remote client 312 wants to use the software means to analyze the market penetration component the remote client 312 will provide the analysis module 305 with instructions to enter a value of (x) for the degree of belly term (B) which is appropriate for that component and product class. The same applies for the other components of market sales volume. The software means 303 of this embodiment is further operable for taking a performed analysis on a client's data file and implementing these changes as a permanent file, such as an additional/subsequent file or a replacement file, into the organized system data file or files of a particular client.

According to the teachings of the present invention, the invention includes embodiments having a system 300 which includes a server 301 coupled to the Internet, a website 310 stored on the server 310, and software means 303 operative on the website 310. According to these embodiments of the invention, the software means 303 allows a user running a client program at a remote client 312 coupled to the Internet to electronically perform analyses on an organized client data file containing information or sales data, e.g. panel data on a particular product for that client, in order to study the impact of marketing conducted on the product or run simulations for a new product. The software means 303 receives the data file from a third party organization and performs a number of analyses on the data file. The remote client 312 can access the website to download and display the analyses performed by the software means 303 on the data file. According to the teachings of the present invention, software means 303 performs a number of analyses on the organized client data file using the formula:

$$\text{Predicted} = Exp(S) \times W^B.$$

Methods According to the Present Invention

Household panel data, which is more widely available, can be used instead of the single-source data as discussed in the prior art works of John Philip Jones. According to the teachings of the present invention, by isolating the individual components of market sales volume and examining time increments against an expectation of off-air time periods, consistent evidence of advertising effects has been found. Also, according to the teachings of the present invention, simulations for predicted new product performance can be analyzed.

The system explained in connection with FIGS. 1, 2, and 3, comprises a processor, a storage device coupled to the processor, and software means operative on the processor, e.g. system collectively, for providing advertising modeling/analysis and simulating expected new product release performance. The system can perform a method of projecting components of market sales volume for a product at a predetermined number of time increments since the starting point of analysis, based on a history of sales from the starting point. The system can further perform methods for simulating expected sales performance for the different market sales volume components for a new product release. The methods include generating a curve from incremental sales data. Generating a curve includes generating a curve which plots a set of incremental sales data versus a number of time increments from the launch of the product or other starting point. The method includes retrieving a component (B) of a curve representing an appropriate degree of belly for the curve for a particular product class and a particular component of market sales volume to be analyzed. The method further includes retrieving a component from the curve representing the slope term S. The method further includes performing a calculation to produce or provide a predicted or continued value of a component of market sales volume using the retrieved components, B and S, in the formula:

$$\text{Predicted} = Exp(S) \times W^B$$

where a W value represents some future time increment beyond the received data points.

As explained in connection with FIG. 1, 2, and 3, the present invention is implemented using computer based systems which have computer readable medium for executing instructions from software means, e.g. programs, for carrying out the methods of the present invention using such systems. These methods include facilitating modeling and forecasting predicted continued performance for any number of components which make up a product sales volume for any number of client organizations, e.g. product manufacturers. The scope of the present invention includes other method embodiments which will be understood by one of ordinary skill in the art upon reading this disclosure.

According to the teachings of the present invention, one method embodiment includes generating a curve from incremental sales data wherein the curve plots a set of incremental sales data versus the number of time increments since the launch of the product or other starting point. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term may precede the retrieval of component B. The method also includes performing a calculation for a predicted or continued market sales volume component using the B component and the slope component (S) in a formula where the formula is:

$$\text{Predicted} = Exp(S) \times W^B$$

where a W value represents some future time increment beyond the received data points.

The same equation is used for estimating all three components of market sales volume, e.g. market penetration, first repeat, and depth of repeat.

The equation in the above embodiment contains only three parameters. The first is the slope term (S), which in some embodiments, is the only parameter which must be solved from the data. The second term, W, is an objective count of the number of time increments elapsed since the start of the data string. The third term is the degree of belly in the curve (B), which modifies W to a specific power. This modifier, B, is usually treated as a constant, different for each component of market sales volume and/or product class, according to the teachings of the present invention. Also, according to the teachings of the present invention, the component B has a tendency to be constant for each product or class of products to be analyzed. The absolute number of cases which deviate from this constant are very small, and the deviations are systematic with variations in occasions per repeater per year.

By far the largest number of products fall within a small range of occasions per repeater per year, between 3.5 and 4.5, allowing these three constants to be used in the vast majority of cases. If a case falls outside the normal range of occasions per repeater per year, it is a simple matter to derive the B term from data for a period previous to that to be analyzed, verify that result for 1-2 other products in the same category, and then use that specific term for that brand/product class.

"Predicted" is the conditionally expected value for any given time increment, based on the "condition" of the specific time increments used in solving for S–"normal" time increments, promotion time increments, advertised time increments, off-air time increments, etc. One of ordinary skill in the art will understand upon reading this disclosure that separate curves can be generated to isolate only the promotion time increments or advertised time increments using only data from those time increments. The same software means and methods are employed and the invention is not so limited to producing predicted values for non promotional or non advertising time increments.

A longitudinal stream of data such as purchase panel data is required for the system and method of the present invention. Purchase panel data is available in about 85% of countries of the world, representing a household by household record of purchasing over time.

Only five to six companies produce panel data. AC Nielsen, Inc., and Information Resources, Inc. (IRI) are the two largest suppliers of panel data. AC Nielsen acquires data through 55,000-60,000 households which use a scanner on their purchases. IRI measures data through the purchaser's credit card at the time of purchase. The present method uses panel data. As discussed hereinabove, aggregate sales figures are used by other systems and methods. Aggregate sales figures are not as effective for performing accurate analysis of marketing effects on the individual components of market sales volumes.

Partitioning the data into three levels is the starting point of modeling according to the present invention, but this can be done by the filter module 307. In some embodiments, the best modeling for the data can require at least 6-8 time increment data points, however, the invention is not so limited. The time increments utilized can be any increment known in the art such as, for example, seconds, minutes, hours, days, weeks, months, and the like, from the start of the analysis, or from some other suitable starting point.

In one exemplary embodiment, it is necessary to know the first time purchase, second time purchase and third through sixth events. These represent penetration, first repeat, and depth of repeat, respectively. Frequent shopper panels, or customer loyalty program data has been found to be better data than aggregate sales figures, which are used in previous methods and can also be utilized with the present invention.

In the present method, the panel data is plotted period by period. The shape of the curve is determined by the replacement cycle of the product(s). When there is a short replacement cycle, the front portion of a curve plotted from incremental sales panel data is nearly vertical, showing linear growth. An example of a product with a short replacement cycle is canned cat food, for of there may be fifteen purchases in about twenty six weekly periods, wherein one weekly period can represent one time increment.

The systems and methods of the present invention work particularly well for frequently purchased branded nondurable goods, i.e. consumer packaged goods advertised through mass merchandising. For example, the systems and methods of the present invention also work with panty hose and stockings.

It is worth noting that esoteric products traditionally have a low product penetration percentage. However, such esoteric products, including such over the counter drugs as eye drops, headache remedies, hair dyes, and the like, can be modeled using the systems and methods of the present invention even though these products have a longer replacement cycles. Another example of such products is over the counter antidiarrheal, which is purchased perhaps once a year.

In addition, the systems and methods of the present invention may be utilized in connection with services. For example, phone ordered pizza delivery is suited for application of the present system and method. The order history provides a purchase panel from which panel data for use is obtained. In addition, eworld, a now defunct on-line service which Apple Computer introduced to compete with AOL, had a growth rate in its first six months which fit the system and method of the present invention.

In general, the systems and methods discussed to this portion of the application generally work better with products which have a replacement cycle shorter than that for wearing apparel, appliances, automobiles, refrigerators, electronics equipment, etc., which have a longer replacement cycle.

In one embodiment, the method is directed to projecting market penetration. This method embodiment includes generating a curve from incremental sales data of initial purchases since the launch of a product, or other starting point, wherein the curve plots the incremental sales data versus the number of time increments since the starting point. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term may precede the retrieval of component B. The method also includes performing a calculation for a predicted or continued market penetration using the B component and the slope component (S) in the formula:

$$\text{Predicted} = Exp(S) \times W^B$$

where a W value represents some future time increment beyond the received data points. A graph showing results of this method embodiment for a particular product class is provided in FIG. 5.

Another embodiment of the present invention includes projecting market first repeat. This method embodiment includes generating a curve from incremental sales data of second purchases, i.e. first repeat purchases, since the launch of a product or other starting point, wherein the curve plots the incremental sales data versus the number of time increments since the starting point. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term (S) may precede the retrieval of component B. The method also includes performing a calculation for a predicted or continued market first repeat using the B component and the slope component (S) in the formula:

$$\text{Predicted} = Exp(S) \times W^B$$

where a W value represents some future time increment beyond the received data points. A graph showing results of this method embodiment for a particular product class is provided in FIG. 6.

Another embodiment of the present invention includes projecting market depth of repeat. This method includes generating a curve from incremental sales data of Nth purchases, where N≧3, i.e. depth of repeat purchases, since the launch of a product or other starting point, wherein the curve plots the incremental sales data versus the number of time increments since the starting point. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term (S) may precede the retrieval of component B. The method also includes performing a calculation for a predicted or continued market depth of repeat using the B component and the slope component (S) in the formula:

$$\text{Predicted} = Exp(S) \times W^B$$

where a W value represents some future time increment beyond the received data points. A graph showing results of this method embodiment for a particular product class is provided in FIG. 7.

One method embodiment incorporates the software means having computer executable instructions described above. The software means are employed by a user at the user's own computer or at a remote client for accessing on-line a server database which has a number of client files. The method includes receiving sales data in the form of panel data and collecting the same in an organized client data file. The method includes using software means to perform the method embodiments described above. In one embodiment, accessing on-line a server database includes accessing on-line the server database over a secure data network. Each client file is an organized system data file, e.g. a customizable, organized data file including panel data of sales, as described earlier, which is downloadable and displayable to a client program at the remote client.

One method embodiment of the present invention includes maintaining a server database. Maintaining the server database includes maintaining a number of client data files which are organized system data files. The method includes accessing the server database on-line from a remote client. The method includes entering a value for a number of time increments (in this case weeks, represented with a W) at which a market sales volume component (e.g. market penetration, first repeat, or depth of repeat) is to be projected. The method includes on-line simulation of the market sales volume components using the organized system data file, and the W value according to the formula:

$$\text{Predicted} = Exp(S) \times W^B.$$

The method includes displaying the report of sales or results of a simulation on a graphical user interface at the remote client.

The method described herein incorporates the software means having computer executable instructions described above for electronically transmitting and/or receiving online a data file from a user in a non-aggregate format, as described herein. The methods of the present invention include filtering the data file. The methods of the present invention further include organizing the data file into an organized system data file from the non-aggregate format from any number of different user platforms.

Another method embodiment of the present invention incorporates the software means having computer executable instructions described above. The software means are employed for maintaining a database which has a number of client files which are organized system data files. As stated above, each client file is an organized system data file, e.g. a customizable, organized data file including products and panel data which is downloadable and displayable to a client program at a remote client. The method includes accessing the server database. The software means can be used to particularly isolate a given component of sales volume performance, at a fixed number of time increments out, by using a curve which plots sales data versus a number of time increments of sales from a product launch, or other starting point as described in detail above. This method includes specifying the time increment (t) for which the predicted component should be displayed. Also, the methods of the present invention include displaying, using the number of web pages or screen displays, specific component of market sales volume over a number of future time increments. In this manner, the present invention affords a remote client with the ability to more precisely analyze the effects of marketing on the sales volume components of its product sales. According to the methods of the present invention, a value for a time increment of a number of weeks W at which market sales volume component, e.g. market penetration, first repeat, or depth of repeat, is to be projected is entered into the system of the present invention. Market penetration analysis, or analysis of any of the other market sales volume components, is simulated using the organized system data file, and the time measurement value, e.g. a W value for weeks according to the formula:

Predicted=$Exp(S) \times W^B$.

The methods of the present invention include displaying the report of sales or results of a simulation on a graphical user interface.

A modified version of the formula above, based on a long term stream of data is:

$V_{1-3} = S \times W^B + I$

The value (1) accounts for break points which are built into data provided subsequent to the first data set provided. This makes it possible, for example, to determine for a projected penetration value the slope term (S) needed to get to that value. In the equation, $V_1$ represents the market penetration component of market sales volume, e.g. a one time sale. $V_2$ represents first repeat. $V_3$ represents depth of repeat, which has an infinite number of sales events.

According to one embodiment of the present invention, where the equation corresponds to the use of cumulative data and the systems and methods are being used to produce a predicted market penetration, the value of B=0.5. According to one embodiment of the present invention, where the equation corresponds to the use of cumulative data and the systems and methods are being used to produce a predicted first repeat, the value of B=0.6. According to one embodiment of the present invention, where the equation corresponds to the use of cumulative data and the systems and methods are being used to produce a predicted depth of repeat (representing sales events up to about six), the value of B=1.48. According to one embodiment of the present invention, where the equation corresponds to the use of decumed data, the value of B for market penetration is B=−0.525, for first repeat B=−0.420, and for depth of repeat B=+0.490. As utilized herein, the term cumulative means the accumulative total since the beginning of the data stream, across several time increments, and the term decumed means the time increments each have a separate accumulated total.

Figure 5:
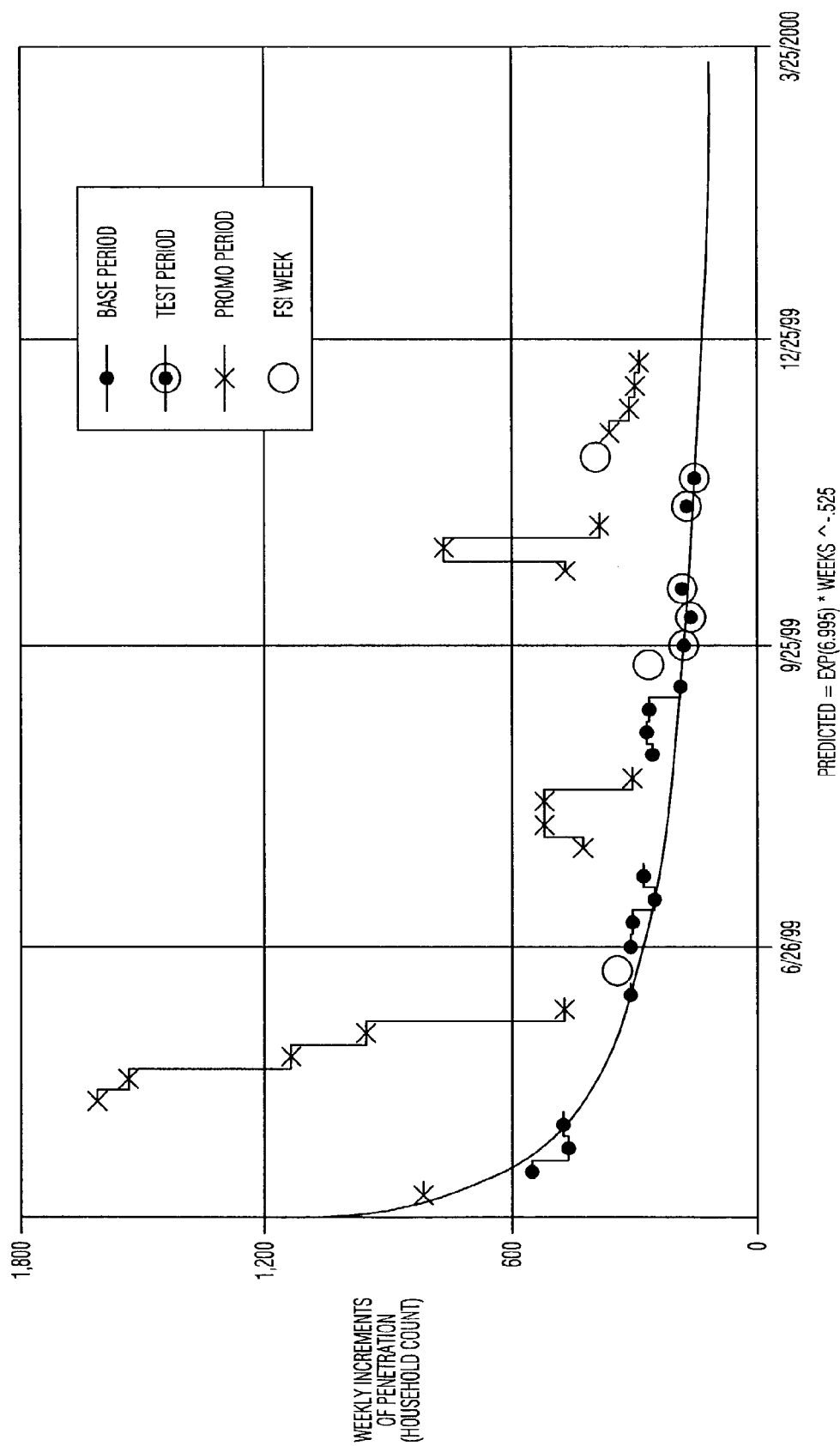
FIG. 5 is a curve representing projected market penetration according to the teachings of the present invention.
Figure 6:
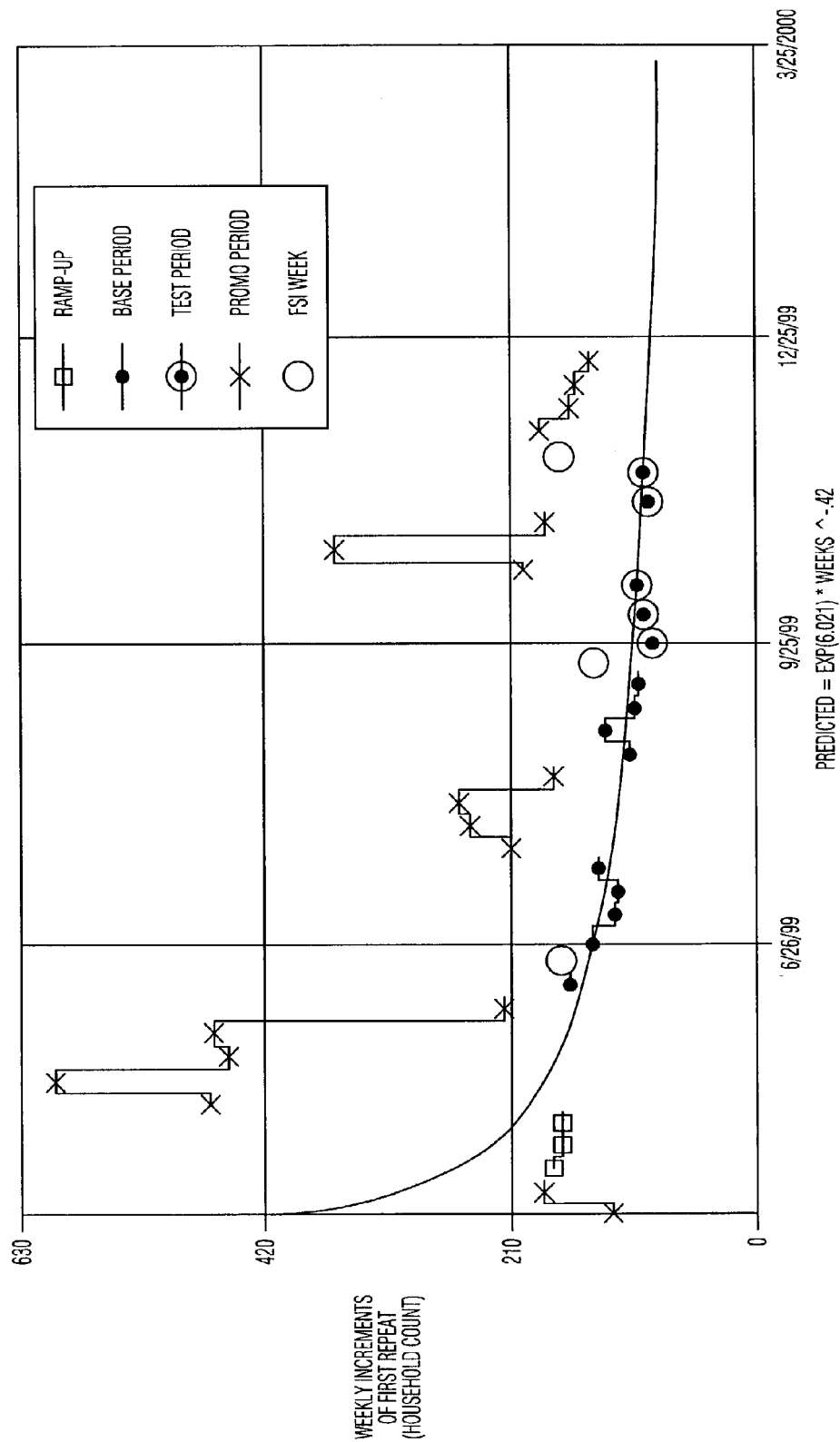
FIG. 6 is a curve representing predicted and projected first repeat according to one embodiment of the present invention.
Figure 7:
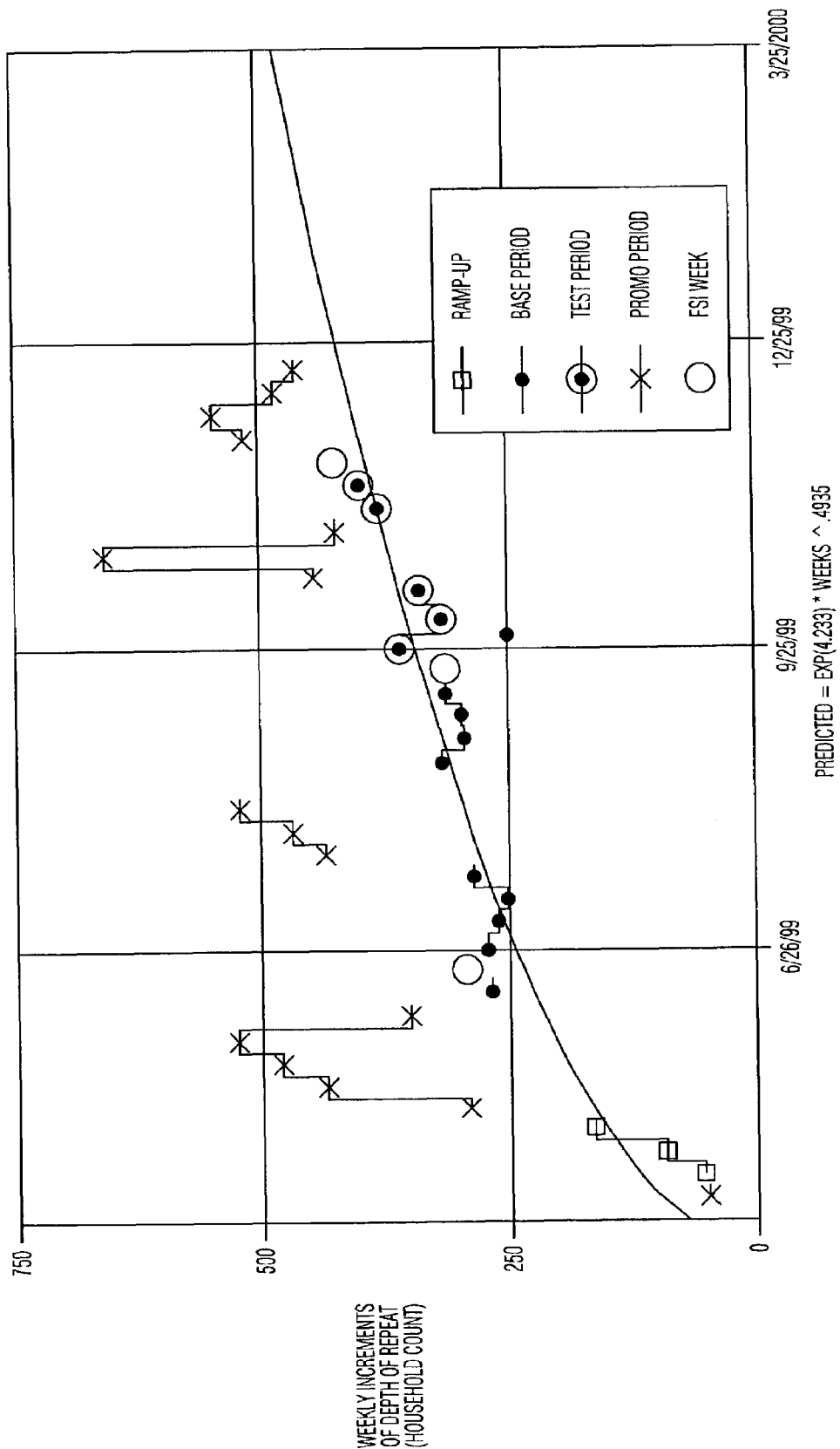
FIG. 7 is a curve representing predicted and projected depth of repeat according one embodiment of the present invention.

FIGS. 5-7 are represent the curves generated by the systems and methods of the present invention for predicting components of market sales volume. FIGS. 5-7 are charts for a human food product (as opposed to pet foods) bought on roughly four purchase occasions per repeater per year.

The data used in the exemplary embodiments of FIGS. 5-7 was obtained from PDI, a shopper loyalty club supplier. The data covers two cities and one chain. The panel included over 166,000 households. The "normal" state data has been modeled, i.e., the data has been classified into time increments of weeks with promotional activity (as defined by a third party source), weeks with Sunday supplement coupons, e.g. Free Standing Inserts (FSI) weeks, and weeks with no promotional or coupon activity (the "normal" state for the product).

The "normal" weeks were arbitrarily divided into a base period and a test period, even though there was no test present. Only the base period increments were used to fit the equations in producing the curves shown in FIGS. 5-7. As explained above, however, the invention is not so limited, and other type period increments can similarly be analyzed using the systems and methods of the present invention. By comparing the expected value from the base period with the actual values from the fictional test period, it is apparent to one skilled in the art how the model could be used to test the effect of any variable, or the effects of the promotional weeks which were held out from the modeling.

The curves shown in FIGS. 5-7 show the individual weeks of each classification, the fit line derived from the base period data (the expected value for each week if it were non-coupon/non-promotional week), and the equation derived from the "normal" week's data. Again, as explained above, however, the invention is not so limited, and other type period increments can similarly be analyzed using the systems and methods of the present invention.

The only modeled component on the charts is the fit line produced by the system and method of the present invention. All the rest is raw, unadjusted data as it comes from the data supplier.

Figure 4:
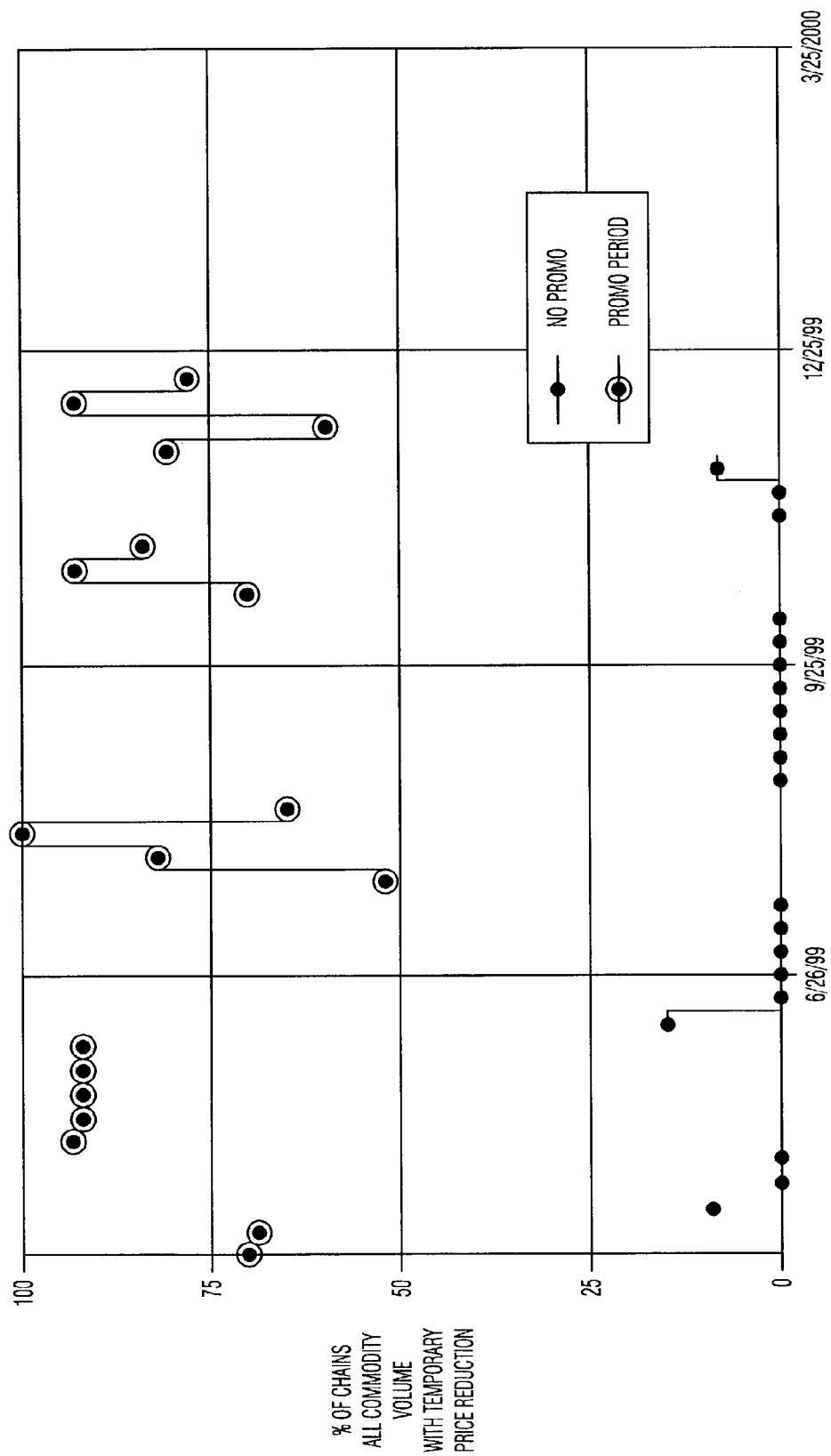
FIG. 4 is a chart representing market sales volume and showing advertising effects for the same for In Store Conditions according to the teachings of the prior art.

All of the stores providing data in this example were from one chain, and the practice of that chain was to promote by offering temporary price reductions (TPR). Contrasting FIG. 4, a chart is shown representing an objective measure of the level of temporary price reduction (TPR) activity, measured in percent % of All Commodity Volume, a measure which weights large and small stores by the volume of all goods sold. Weeks designated by a bulls eye were counted as promotion weeks (Promo Period). Weeks designated by a bullet were counted as non-promotional weeks. This is not as effective an analysis technique as the systems and methods of the present invention.

Referring to FIG. 5, a graph is shown, which represents weekly increments of penetration. Weeks designated by a bullet correspond to the base period. Weeks designated by a bulls eye correspond to the test period. Weeks designated by X correspond to the promotional period. Weeks designated by a circle correspond to a FSI week.

The formula, according to one embodiment of the systems and methods of the present invention, used in FIG. 5 is:

Predicted=$Exp(6.995) \times W^{-0.525}$ again, where weeks is designated by a W.

Referring to FIG. 6, a graph is shown, which represents weekly increments of first repeat. Weeks designated by a square correspond to the ramping up period. Weeks designated by a bullet correspond to the base period. Weeks designated by a bulls eye correspond to the test period. Weeks designated by X correspond to the promotional period. Weeks designated by a circle correspond to a FSI week.

The formula, according to the systems and methods of the present invention, used in FIG. 6 is:

Predicted=$Exp(6.021) \times W^{-0.4200}$ again, where W represents a weekly time increment.

Referring to FIG. 7, a graph is shown, which represents weekly increments of depth of repeat activity. Weeks designated by a square correspond to the ramping up period. Weeks designated by a bullet correspond to the base period. Weeks designated by a bulls eye correspond to the test period. Weeks designated by X correspond to the promotional period. Weeks designated by a circle correspond to a FSI week.

The formula, according to one embodiment of the systems and methods of the present invention, used in FIG. 7 is:

$$\text{Predicted} = Exp(4.233) \times W^{-0.4935}$$

again, where W represents a weekly time increment.

Additional Embodiments

The above description outlines a simple but powerful method for describing the growth of product penetration and repeat during periods of little or no marketing activity. These "no marketing" growth rates can be compared to what is actually experienced as the result of various marketing activities such as advertising, couponing, and in-store promotion, in order to measure the effectiveness of these activities.

The embodiments discussed below provide additional mathematical treatment of the procedures used to create the expected "no marketing" values of incremental penetration and incremental repeat. Embodiments discussed below address both conditions of relatively stable product purchasing (the "static case") and changing product purchasing (the "dynamic case").

Although the embodiments are framed in terms of analyzing purchase occasions as a key variable, the embodiments outlined here work equally well for a wide variety of measures including percentages or proportions of households or individuals buying a given product.

As described above, embodiments of the present invention include software, application modules, and computer executable instructions operable on devices and systems described herein. The embodiments, however, are not limited to any particular programming language. Thus, the invention includes a set of instructions executable by an information handling system, having processor and memory capabilities, to produce the embodiments described herein.

As one of ordinary skill in the art will appreciate upon reading this disclosure, various methods are performed herein using computer executable instructions created, implemented, and organized to carry out the aspects of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

A. Method for Predicting Product Penetration (A First Purchase for a Given Entity or Household)

As used herein, the tern brand is intended to identify a product or products produced by a particular manufacturer, as is the term's everyday meaning in common business parlance. By way of example, "Cheerios" is a brand of ready-to-eat cereal, "Hellman's" is a brand of mayonnaise, "Snickers" is a brand of chocolate candy bars, and "Energizer" is a brand of batteries. The term "brand" can be applied to identify members of large, very inclusive classes of products or services, or smaller, more tightly defined classes of products or services. For example, "Energizer" is both a brand within the broadly-defined category of electrical storage batteries, and also is an identifying brand name within the smaller category of nine-volt batteries or the category of "AA" batteries. Alternately, "Diet Coke" can be construed as a brand name within a larger, more extensive brand name, "Coke". "Diet Cherry Coke" is a further sub-branding of "Diet Coke" and also can be viewed as a brand of its own.

The systems and methods disclosed in this Application can be used to characterize consumer purchasing of "products" as the term is understood in a broad sense for example, such as the products of an entire industry (e.g. all soft drink products) down the narrowest meaning of the term, for example, for a single class of products (e.g., "twelve ounce cans of Diet Cherry Coke sold through vending machines"). Use of the term "products" is not intended to limit the art taught herein.

As described in detail above, a set of computer executable instructions can be provided which are operable to perform the various aspects of the present invention. One aspect of the present invention includes computer executable instructions operable for performing the following methods.

That is, according to the teachings of embodiments of the present invention, a set of computer executable instructions are operable on a system for generating a curve from a set of purchase data. The generated curve plots a volume of first time sales for a product versus a time period such as, for example, a number of hours, days, weeks, months, and the like from a product launch, from the start of the analysis, or from some other suitable starting point. The set of computer executable instructions are operable for retrieving a B component of the curve representing a degree of curvature of the curve. As one of ordinary skill in the art will understand upon reading this disclosure, the B component can be understood as the degree to which curvature departs from zero. Curvature is defined as the degree of curving of a line. The B component can also be understood as an expression of the speed of approach of a curve to an asymptote. An asymptote is defined as a straight line approached by a given curve as one of the variables in the equation of the curve approaches infinity. As used herein, the degree of belly in a curve refers to the curve's degree of curvature.

In the various embodiments, the set of computer executable instructions are further operable for retrieving a component of the curve (S) representing a slope term of the curve. And, the computer executable instructions are operable for performing a calculation to produce a predicted, continued product penetration of the product by applying the B component and the S component in a formula, wherein the formula is:

$$\text{Predicted} = Exp(S) \times W^B.$$

The expression "Exp(S)" in the equation $Exp(S) \times W^B$ can be thought of as a slope or slope-like characteristic in that, for a given value of B and at a particular point in time, or between two particular points in time, it specifies the rate of change in a dependent variable. Suppose that two products, Product X and Product Y, have identical or near-identical characteristic values of B. If the rate of change in incremental product penetration at a common point in time for the two products (for example, ten weekly increments after the start of the data stream) is analyzed, the expression Exp(S) when evaluated for each product quantifies the difference in slopes for the two characteristic equations.

In one embodiment according to the teachings of the present invention, the formula can also be expressed as a function of a term s, a term t, and a term B in a form of:

$$f(t) = s \times t^B. \tag{1}$$

In Eq. (1) the term s can be thought of as a scaling factor that is proportional to a product's size, the term t is an elapsed time from a product launch, or other starting point, and the term B is a value associated with a product purchase cycle. The scaling factor can be any suitable value known in the art. For example, products having larger amounts of sales can be assigned larger values of s and products having smaller amounts of sales can be assigned a smaller value. In various embodiments, the scaling factor can be defined from evaluation of the term Exp(S) representing a slope or slope-like element for a set of data. In various embodiments, the scaling factor could also be, for example, defined from the total number of products sold, the application is not so limited. Additionally, in the various embodiments, the term B includes a variable value that is variable from one product to a next product depending on a purchase cycle. In the various embodiments, the term B typically has a value in the range of $-0.25$ to $-0.75$, although the invention is not so limited.

In the various embodiments, as long as a product's year-to-year purchase volume is relatively stable, that product's expected penetration increments (first purchase occasion) can be well described by equations of the form $f(t)=s \times t^B$.

In the various embodiments, the set of computer executable instructions are operable to apply the formula $f(t)=s \times t^B$ a set of received purchase data wherein again a t term is an elapsed time increment from a starting point of analysis, such as the time from the product launch, and the B term is a variable value associated with a product purchase cycle. According to the teachings of the present invention, the set of computer executable instructions are operable to calculate and apply the B term by using an iterative process to fit a curve, according to the formula $f(t)=s \times t^B$ to the set of purchase data such that the B term represents a degree of curvature in the curve. And, as one of ordinary skill in the art will understand upon reading this disclosure, the set of computer executable instructions apply the t term as representing a selectable elapsed time, e.g. in weeks, since a starting point for an analysis. Using the set of computer executable instructions to fit a curve to a set of purchase data according to the formula $f(t)=s \times t^B$ allows the computer executable instructions to determine a value for the term s and the term B which can be stored and reapplied for the product as a scaling factor. According to the teachings of the present invention, the scaling factor (s) is proportional to a product size and the B term, or value, is associated with a product purchase cycle.

In the various embodiments of the invention, the set of computer executable instructions are operable for projecting the penetration of a product in a client file at a selectable point in time from a product launch or other starting point, based on a set of received purchase data for the product. As described above, the set of computer executable instructions operable for receiving the set of purchase data. The set of purchase data can be provided by any number of actual sale or test market consumer product purchase gathering sources. The invention is not so limited. The present invention is directed to the analysis of that data once collected. In the various embodiments, the set of computer executable instructions are operable for graphically displaying the set of purchase data as a volume of first time product sales versus a time period, such as a number of weeks, from the product launch or other starting point.

Figure 8:
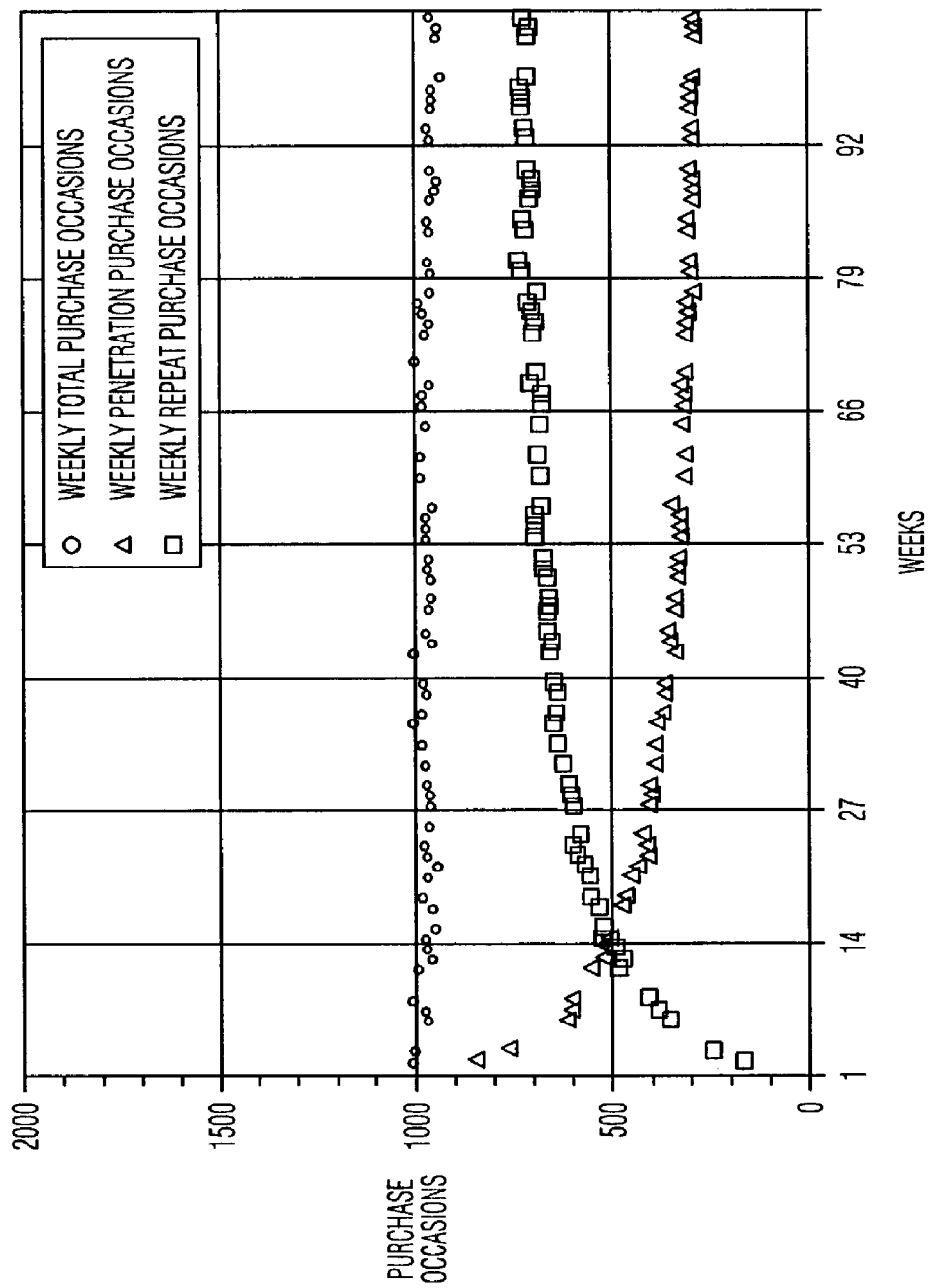
FIG. 8 is a graph plotting received product purchase data in volume versus time for a product having a stable period to period purchase volume according to one embodiment of the present invention.

FIG. 8 illustrates a graphically displayed set of product purchase data as measured in volume versus time for a product having a stable period to period purchase volume according to one embodiment of the present invention. Note that in this and the following Figures, the data portrayed are for no-marketing or "off-air" time increments only. The invention, however, is not so limited. In the embodiment shown in FIG. 8, a value for total weekly product purchase occasions is represented by data points in the geometric form of a circle. The weekly incremental total product purchase occasions represent a sum for a given week of both the first product purchase (product penetration) by each household or single entity and the total weekly product repeat purchase occasions (the first repeat purchase and subsequent repeat purchases) by each household or single entity. In the embodiment shown in FIG. 8, the product penetration purchase data is represented by data points in the geometric form of a triangle and the product repeat purchase data is represented by data points in the geometric form of a square. As one of ordinary skill in the art will appreciate upon reading this disclosure any suitable representation for distinguishing between a given class of data points can be used.

According to the teachings of the present invention, the set of computer executable instructions are operable for mapping a first curvilinear function to the weekly incremental product penetration purchase occasions that are graphically displayed in the set of purchase data by applying a probability distribution function to fit a curve to the received purchase data points shown in FIG. 8. In the invention, and as described above, the set of computer executable instructions utilize a function in the form $f(t)=s \times t^B$, wherein a t value is an elapsed time from the product launch or other starting point, and a B value is value associated with a product purchase cycle, and the s value is a scaling factor that is proportional to the volume of product sales. The instructions fit a curve to the displayed set of first purchase data points according to a function expressed $f(t)=s' t^B$, wherein fitting the curve to the displayed set of first purchase data points provides an s value and a B value, and wherein a t value is defined as the time increment for each data point. As before, the B value is calculated to appropriately fit the set of purchase data and will represent a degree value for the curvature or belly of the curve. As mentioned above the B value can be stored and reapplied in analyses of a product or to products falling within a class of products, such as products within a brand or an industry. The B value includes a variable value that is variable from one product to a next product depending on a product purchase cycle.

Figure 9:
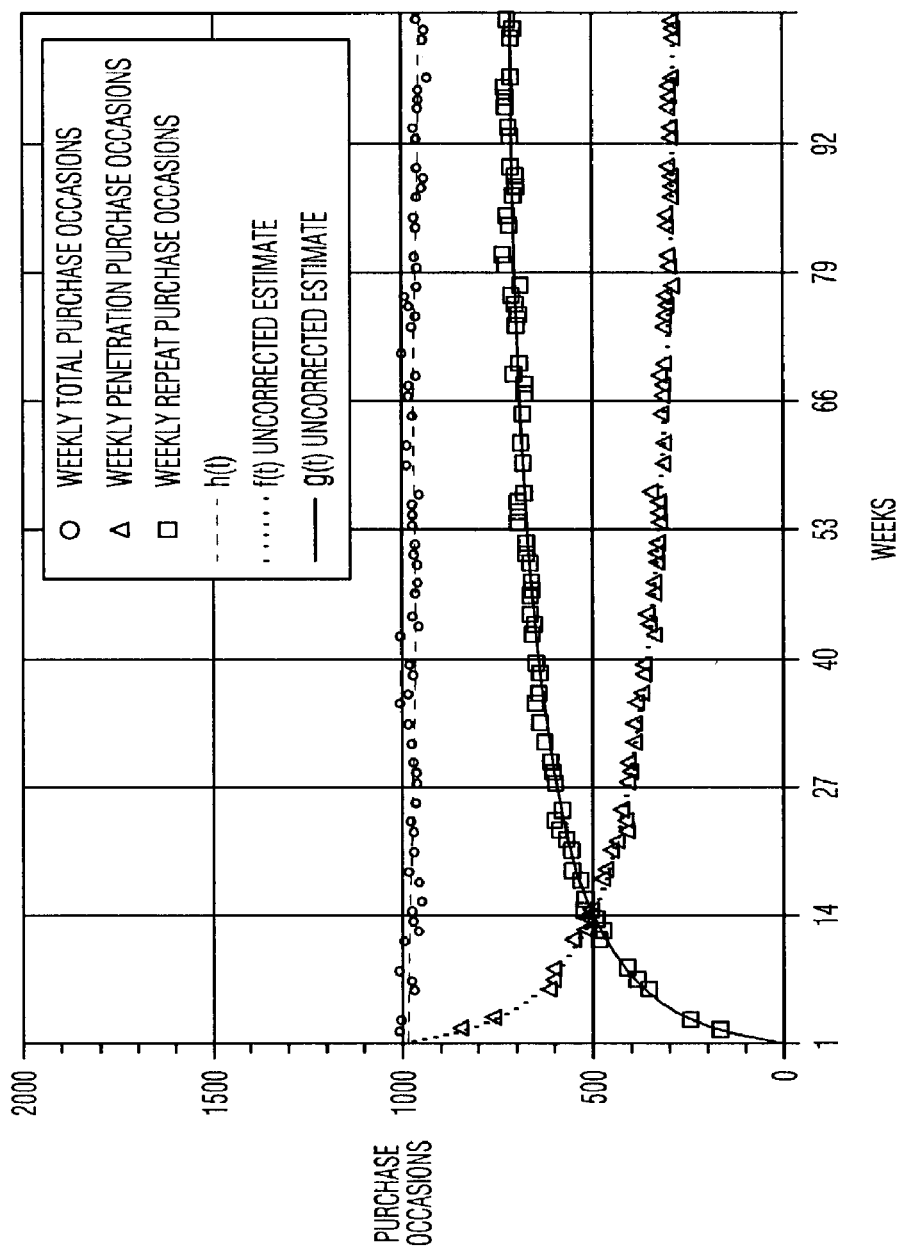
FIG. 9 is a graph mapping a first and a second curvilinear function to the received product purchase data of FIG. 8 according to one embodiment of the present invention.

FIG. 9 illustrates a first curvilinear function mapped to the received product purchase data of FIG. 8 according to one embodiment of the present invention. As shown in the embodiment of FIG. 9, using the set of computer executable instructions to fit the first curvilinear function to the incremental product penetration purchase occasion data points by applying a function of the form $f(t)=s \times t^B$ provides a highly accurate and robust mapped curvilinear fit to the incremental product penetration purchase occasion data points, particularly in cases where the incremental product penetration purchase data points have been collected for values of t greater than 5 weekly increments. As one of ordinary skill in the art will appreciate, the mapped first curvilinear function can be used for estimating what incremental product penetration purchases should have been, absent promotions and advertising, or predicting future incremental product penetration purchases, absent promotions and advertising, at a later point in time based on actual received purchase data from previous non-promotional, or "off-air," advertising weeks. Additionally, the predicted future incremental product penetration purchases can be used to provide a visual and quantifiable comparison between a predicted volume of product penetration purchases at any given point in time to an actual set of product penetration purchase data such that an efficacy of promotional and advertising effects can be assessed.

In the various embodiments of the present invention, the set of computer executable instructions are further operable for incorporating a selectable translation parameter (m) in to the applied probability distribution function. In these embodiments the computer executable instructions apply a function of the form $f(t)=s \times (m+t)^B$, when mapping a first curvilinear function to the incremental product penetration purchase data. As one of ordinary skill in the art will appreciate upon reading this disclosure, a non-zero in value will shift the curvilinear function along an x-axis of the graphical display, wherein the x-axis represents a time period, such as the number of weeks from the product launch, or other starting point.

In various embodiments, the set of computer executable instructions apply a selectable translation parameter (m) of m=−0.5 in mapping the first curvilinear function to the incremental product penetration purchase data. Thus, the set of computer executable instructions apply a function of the form $f(t)=s \times (t-\frac{1}{2})^B$, in mapping the first curvilinear function to the incremental product penetration purchase. The set of computer executable instructions are operable to calculate an s value and a B value in applying the function $f(t)=s \times (t-\frac{1}{2})^B$ using curve fitting techniques to the received non-promotional, non-advertising set of purchase data. As mentioned above, the s value represents a scaling factor that is proportional to a product size and a B value is associated with the product purchase cycle. As used herein, a product size is intended to mean a volume of total product sales in the consumer marketplace and a product purchase cycle represents a frequency in which a product is purchased. The set of computer executable instructions are operable to associate the scaling factor s and the B value with a particular product and to reapply the s and B values in further forecasts, predictions and analysis of the product.

To restate, in various embodiments, a translation parameter in is incorporated by the set of computer executable instructions in applying an appropriate function to the set of purchase data in mapping a first curvilinear function to the same. In these embodiments, the set of computer executable instructions apply a function represented as $f(t)=s \times (m+t)^B$. Applying the translation parameter m will translate (shift) a mapped first curvilinear function defined by f(t) to the right or left.

It is possible to use other values of the translation parameter m that are near m=−1 when, by so doing, the computer executable instruction provide a mapped first curvilinear function which more accurately matches the actual received set of purchase data points.

According to the teachings of the present invention the function $f(t)=s \times t^B$ applied by the set of computer executable instructions to map a first curvilinear function to the received incremental product penetration purchase data points describes real-world data with a high degree of accuracy for all values of t above 2 or 3. However, the computer executable instructions can apply a function represented as:

$$f(t)=s \times (t-\frac{1}{2})^B, \quad (2)$$

Although this equation can be utilized when t equals any number, those skilled in the art will under stand that the equation can provide enhanced "fit" to the received incremental product penetration purchase data points when t=1 or 2. According to the teachings of the present invention, Eq. (2) is derived by the set of computer executable instruction using a selectable translation parameter of m=−0.5

As one of ordinary skill in the art will appreciate upon reading this disclosure, for larger values of t the improvement in fit provided by Eq. (2) is relatively negligible.

B. Alternate Method for Predicting Product Total Repeat

Because penetration and repeat purchases account for all of a brand's purchasing, it must be true that total purchases less penetration purchases equals repeat purchases! Thus, another embodiment of the present invention is operable for modeling and predicting product total repeat, e.g. the first repeat purchase and all subsequent repeat purchases of a product by each household or single entity. In these embodiments, the computer executable instructions are operable on a system, as described above, for projecting total repeat of one or more products in a client file at a predetermined period of time t, based on a set of purchase data for a product having a stable period to period purchasing behavior. In the these embodiments, the set of computer executable instructions are operable for defining a function (h(t)) representing total product purchase occasions. In some embodiments, the computer executable instructions use a k value equal to total incremental product purchases and apply that constant as a value for s.

In these embodiments, the set of computer executable instructions are operable for defining a function (g(t)) representing incremental product repeat purchases. As before, the set of computer executable instructions are further operable for defining a function (f(t)) representing incremental product penetration purchases (first product purchase by each household or single entity). As described in detail above, defining the function f(t) includes defining the function as $f(t)=s \times t^B$. Again, an s value is a scaling factor that is proportional to a product size, a t value is an elapsed time from the product launch, or other starting point, and a B value is a value associated with a product purchase cycle. The set of computer executable instructions apply a function of the form $f(t)=s \times t^B$ or a function of the form $f(t)=(m+t)^B$, to a set of purchase data received at specific time increments in order to provide an s value and a B value as has been described above. The m value is a selectable translation parameter as the same has been described above.

According to the teachings of the present invention, the set of computer executable instructions are operable for defining a functional relationship between the functions h(t), g(t) and f(t). This functional relationship is defined by the computer executable instructions as g(t)=h(t)−f(t).

As has been noted above, the set of computer executable instructions are operable for receiving a set of purchase data. The received set of purchase data includes information on incremental product repeat purchases, on incremental product penetration purchases, and on total incremental product purchase occasions. The set of computer executable instructions are operable for graphically displaying the information on incremental product repeat purchases, the information on incremental product penetration purchases, and the information on total incremental product purchase occasions as data points representing a volume of incremental product repeat purchases, incremental product penetration purchases, and total incremental product purchase occasions measured on a first axis versus one or more time increments (t) measured on a second axis. The same is shown in FIG. 8.

As described in connection with FIGS. 8 and 9, the set of computer executable instructions are operable for mapping a first curvilinear function to the graphically displayed incremental product penetration purchase data points by applying the function $f(t)=s \times t$ B or $f(t)=s \times (m+t)^B$. Again, the translation parameter (m) will shift the curvilinear function along the second axis of the graphical display. FIG. 9 illustrates the mapped first curvilinear function to the graphically displayed weekly incremental product penetration purchase data points as a dotted line.

In the various embodiments for modeling and predicting product total repeat, the set of computer executable instructions are operable for mapping a second curvilinear function to the graphically displayed incremental product repeat purchase data points. According to the teachings of the present invention, the computer executable instructions map the second curvilinear function by applying the function relationship $g(t)=h(t)-f(t)$ to the graphically displayed incremental product repeat purchase data points. Alternatively expressed, the set of computer executable instructions map the second curvilinear function by applying the functional relationship $g(t)=s-(s \times t^B)$.

FIG. 9 illustrates the second curvilinear function mapped to the graphically displayed weekly incremental product repeat purchase data points as a solid line. The first and the second mapped curvilinear functions, e.g. dotted line and solid line, cross one another on the graphical display at a particular time increment ($t_{crit}$). In the case of a product having stable period to period purchasing the first and second functions are mirror-symmetrical around a line y=s/2.

According to the teachings of the present invention, the particular t value ($t_{crit}$) at which the first and the second mapped curvilinear functions e.g. dotted line and solid line, cross provides a direct indication of a product purchase cycle. One of ordinary skill in the art will understand upon reading this disclosure, that the larger the particular t value at which the first and the second mapped curvilinear functions e.g. dotted line and solid line, cross the longer a product purchase cycle.

In the present invention, the set of computer executable instructions are operable in one mode to determine the B value using the $t_{crit}$ value and the computer executable instructions are operable for resolving the B value, associated with a product purchase cycle, according to a function $B=\log(\frac{1}{2})/\log(t_{crit})$. Thus, according to the teachings of the present invention, the computer executable instruction are operable for resolving the B value by applying the function, $f(t)=s \times t^B$, to received incremental product penetration purchase data using curve fitting techniques to determine/provide an s value and a B value. And, additionally the computer executable instructions are operable for resolving the B value, associated with a product purchase cycle, according to a function $B=\log(\frac{1}{2})/\log(t_{crit})$. That is, the computer executable instructions can determine a ($t_{crit}$) value by analyzing received product purchase data which includes information on incremental product repeat purchases, on incremental product penetration purchases, and on total incremental product purchase occasions and resolving at which particular time increment $t_{crit}$ the incremental product repeat purchase data points and incremental product penetration purchase data points (or the first and the second mapped curvilinear functions) cross.

In the case where a curve of the form $f(t)=s \times (m+t)^B$ is to be fitted to product penetration purchases, it can be shown that B can be derived by use of the formula B $\log(\frac{1}{2})/\log(m+t_{crit})$. For simplicity's sake, from this point on only the simpler case of $B=\log(\frac{1}{2})/\log(t_{crit})$ will be used, with the understanding that the other version is appropriate for functions of the form $f(t)=s \times (m+t)^B$.

It can also be shown that for short periods, such as weeks, the value of total repeat purchases at t=1 weekly increment is either zero or negligibly small. This means that the function g(t) will be zero or very near zero at t=1. Accordingly the value of f(t) at t=1 will be $s \times (1)^B$, and s will be the total purchase occasions per week, at t=1. This relationship serves as a starting point in a number of illustrative cases to follow.

As one of ordinary skill in the art will appreciate upon reading this disclosure, mapping the second curvilinear function to the graphically displayed incremental product repeat purchase data points, shown as the solid line in FIG. 9, by applying the function relationship $g(t)=s-(s \times t^B)$ can be used to provide a predicted volume of product repeat purchases at a later point in time from the product launch, or other starting point. If the received incremental product repeat purchase data points are from non-promotional, non-advertising, or "off-air" time increments, then the mapped second curvilinear function will provide an expected volume of product repeat purchases at a later point in time from the product launch, or other starting point under conditions of non-promotional, non-advertising, or "off-air" time increments.

According to the teachings of the present invention, the set of computer executable instructions are further operable for receiving and graphically displaying actual incremental product repeat purchase data for purchased data received at the later point in time. As such, the graphical display of the mapped second curvilinear function, shown as a solid line in FIG. 9, will provide a visual and quantifiable comparison between the predicated, or expected, volume of product repeat purchases at the later time to the actual incremental product repeat purchase data received at the later time such that an efficacy of advertising or promotions run, or "aired", at that later time can be assessed. Modeling and predicting product volume penetration using the computer executable instructions defined herein is remarkably accurate for all values of t.

In the various embodiments, the set of computer executable instructions are operable to apply a m value of −0.5 such that mapping the second curvilinear function to the graphically displayed incremental product repeat purchase data points includes mapping by applying the function relationship $g(t)=s-(s \times (t-\frac{1}{2})^B)$. According to the teachings of the present invention, the set of computer executable instructions are operable to iteratively solve for the s value, and the B value using curve fitting techniques applied to the graphically displayed incremental product repeat purchase data points for a particular product. Alternatively, in another mode the computer executable instructions are operable are operable for resolving the B value, associated with a product purchase cycle, according to a function B $\log(\frac{1}{2})/\log(t_{crit})$ as described in detail above.

In the various embodiments of the present invention, the set of computer executable instructions are operable to record and reapply the B value for a particular product in subsequent calculations and analyses once the B value has been determined for the particular product. Likewise, the set of computer executable instructions are operable to record and reapply the s value for the particular product in subsequent calculations and analyses once the s value has been determined for the particular product. It is noted that according to the teachings of the present invention, the B value and the s value do not have to be resolved independently. One of ordinary skill in the art will understand upon reading this disclosure that the set of computer executable instructions are operable to iteratively solve for the s value, and the B value by applying the functions defined herein using curve fitting techniques applied to the graphically displayed incremental product repeat purchase data points for a particular product.

D. Alternate Method for Predicting Product First Repeat

In the various embodiments of the present invention, the set of computer executable instructions are further operable for partitioning total repeat into the first repeat occasion (second purchase for each household) and subsequent repeats (third and later purchases). The equations provided in the first part of this disclosure provide a sound basis for this task.

An alternative embodiment is provided at this point in the disclosure. In this alternative embodiment, a set of computer executable instructions are operable on a system, as described herein for determining product first repeat for one or more products in a client file at a predetermined number of time increments, t, since a product launch, or other starting point, based on a set of purchase data for a product having a stable period to period purchasing. In the various embodiments, the set of computer executable instructions are operable for receiving the set of purchase data for the product. The set of purchase data includes information on a product purchase frequency distribution, including an incremental product repeat purchase volume and an incremental product penetration purchase volume, over a period of time (t). The set of computer executable instructions are operable for calculating a mean (u) for the product purchase frequency distribution information in the received data. According to the teachings of the present invention, the set of computer executable instructions are operable for determining a q value by iteration using an equation $u = -q/(1-q) \times \ln(1-q)$.

The set of computer executable instructions are operable for partitioning incremental product repeat purchase information in the received data into a volume of first repeat purchases and a volume of subsequent repeat purchases by defining a function for repeat purchases ($p_r$). In the invention, the set of computer executable instructions define the function for repeat purchases as $p_r = -q^r/r \times \ln(1-q)$. The set of computer executable instructions having determined a q value by iteration of the known calculated u value from the data points for the incremental product repeat purchase volume, can now apply the q value according to the equation $p_r = -q^r/r \times \ln(1-q)$. As used herein, an r value represents a number of purchases by a single entity, or each household, over the period of tine increments (t). Thus, the set of computer executable instructions applies an r value of r=2 in order to calculate or determine a first repeat purchase by the single entity, or household. The function value for $p_2$ (first repeat) can thus be partitioned, by the set of computer executable instructions, from the incremental product repeat purchase volume for given time increments (t).

In the various embodiments, the set of computer executable instructions are further operable for graphically displaying the function value for $p_2$, or volume of first repeat purchases ($p_2$) and the volume of subsequent repeat purchases ($p_{r>2}$) over a period of time, or across values of t. In the various embodiments, the set of computer executable instruction are further operable to apply curve fitting techniques to the graphically displayed volume of first repeat purchases ($p_2$) and the graphically displayed volume of subsequent repeat purchases ($p_{r>2}$) over a period of time for a particular product in order to predict a volume of first repeat purchases ($p_2$) and a volume of subsequent repeat purchases ($p_{r>2}$) a later point in time.

E. Extension of Method to the Dynamic Case

According to the teachings of the present invention, both the "static" and "dynamic" cases can be handled using a similar approach. The principle difference resides in specifying the function h(t).

The function h(t) can have many possible behaviors depending on the class, or type, of product and/or the sales health of the product. That is, a given product can be enjoying a constant incremental total product purchase occasions. A given product can be enjoying a strong growth in incremental total product purchase occasions. A given product can alternatively be experiencing a decline in incremental total product purchase occasions. A given product can experience a spike in incremental total product purchase occasions, such as for example, due to an article about the product. And, given product can realize a highly cyclical or seasonal effect in incremental total product purchase occasions such as can be the case in a product type or class such as batteries, ice cream and/or sun tanning lotion.

In the invention, the procedures for estimating Incremental Purchase Occasions and Incremental Repeat Occasions are the same, irrespective of the form of h(t). That is, the set of computer executable instructions are operable for receiving the set of purchase data for any given product whether it is experiencing increasing sales, declining sales, and/or seasonal or cyclical sales. As before, the set of purchase data includes information on a product purchase frequency distribution, including total incremental purchases, incremental product repeat purchases, and incremental product penetration purchases, as collected over a period of time (t).

In the various embodiments of the present invention, the set of computer executable instructions are operable for analyzing a product experiencing a "dynamic" total incremental purchase volume. That is, according to various embodiments, a set of computer executable instructions are operable on a system, as defined herein, for projecting product volume penetration for one or more products in a client file at a predetermined number of time increments, t, since a product launch, or other starting point, based on a set of purchase data for a product having a non-constant rate of purchase. In the various embodiments for such a "dynamic" case, the set of computer executable instructions are operable for defining a function h(t) representing total incremental product purchase occasions over a period of time (t). In the "dynamic" case embodiment, h(t) can be increasing, decreasing and seasonal or cyclical sales fluctuations.

According to the dynamic case embodiments, the set of computer executable instructions are operable for defining the function h(t) as:

$$h(t) = s + j(t). \quad (3)$$

In the various embodiments, the computer executable instructions are operable for resolving an s value as representing an initial value for total incremental product purchase occasions from the received set of purchase data. It is noted that in the earlier "static" case description, e.g. where a product has a stable incremental total purchase occasions, the computer executable instructions defined h(t)=s. The static case is then a form of Eq. (3) in which a value j(t)=0 for all values of t. A growing product will be characterized by an h(t) which increases as t increases, a declining product will be characterized by an h(t) which decreases as t increases, and a seasonal product will be characterized by an h(t) which oscillates over incremental time periods.

The set of computer executable instructions are operable for defining a function g(t) representing incremental product repeat purchases and are operable for defining an unadjusted function (f(t)) representing incremental product penetration purchases for a product having a non-constant rate of purchase. Initially, the computer executable instructions define the function f(t) as $f(t)=s\times t^B$ or $f(t)=s\times(m+t)^B$, as explained in detail above in connection with a product experiencing a stable period to period total purchase volume. Likewise, the computer executable instructions are operable to calculate a value for the function g(t) in relation to f(t) and h(t) as the same has been described in detail above in connection with FIGS. 8 and 9. That is, according to the teachings of the present invention, the computer executable instructions are operable for defining a function relationship between the functions h(t), g(t) and f(t) as $g(t)=h(t)-f(t)$. Again, as used herein an s value is a selectable scaling factor that is proportional to a product size, a t value is an elapsed time from the product launch, or other starting point, and a B value is a selectable value associated with a product purchase cycle. In some embodiments, the computer executable instructions derive the function f(t) from a function $f(t)=s\times(m+t)^B$. The m value is a selectable translation parameter.

As before, the computer executable instructions are operable for receiving a set of purchase data. The set of purchase data can be collected from any number of sources, as described herein, and includes information on incremental product repeat purchases, on incremental product penetration purchases, and on total incremental product purchase occasions. The computer executable instructions are operable for graphically displaying the information on incremental product repeat purchases, the information on incremental product penetration purchases, and the information on total incremental product purchase occasions as data points representing a volume of incremental product repeat purchases, incremental product penetration purchases, and total incremental product purchase occasions measured on a first axis versus one or more time increments measured on a second axis.

Figure 10:
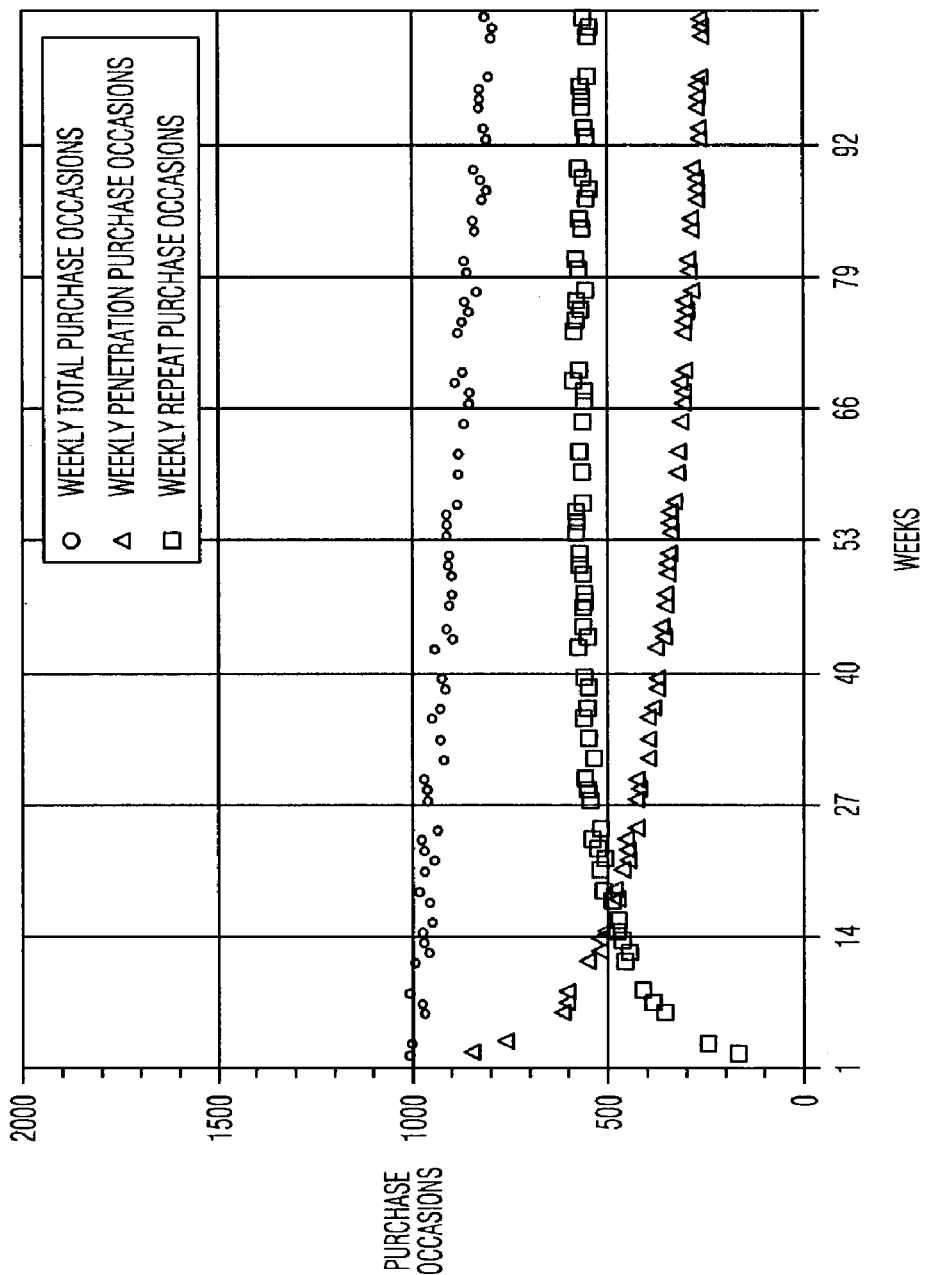
FIG. 10 is a graph plotting received product purchase data in purchase occasions versus time for a product having a non-constant rate of purchase, according to one embodiment of the present invention.

FIG. 10 is a graph plotting received product purchase data in volume versus time increments for a product having a non-constant rate of purchase, e.g. the dynamic case, according to one embodiment of the present invention. In the embodiment shown in FIG. 10 a product is experiencing a decline in incremental total purchase occasions. In the embodiment shown in FIG. 10, a value for total incremental product purchase occasions is represented by data points in the geometric form of a circle. The incremental total product purchase occasions represent a sum for a given time increment of both the first product purchase (product penetration) by each household or single entity and the total incremental product repeat purchase occasions (the first repeat purchase and subsequent repeat purchases) by each household or single entity. In the embodiment shown in FIG. 10, the product penetration purchase data is represented by data points in the geometric form of a triangle and the product repeat purchase data is represented by data points in the geometric form of a square. As one of ordinary skill in the art will appreciate upon reading this disclosure any suitable representation for distinguishing between a given class of data points can be used.

From the received set of purchase data, the computer executable instructions are operable for determining a t critical value ($t_{crit}$) at which the incremental product repeat purchase data points, represented as squares in FIG. 10, and the incremental product penetration purchase data points, represented as triangles in FIG. 10, cross. As described in detail above, the computer executable instructions are operable for determining a B value by using ($t_{crit}$). In various embodiments, the computer executable instructions determine the value according to a function $B=\log(\frac{1}{2})/\log(t_{crit})$.

Figure 11:
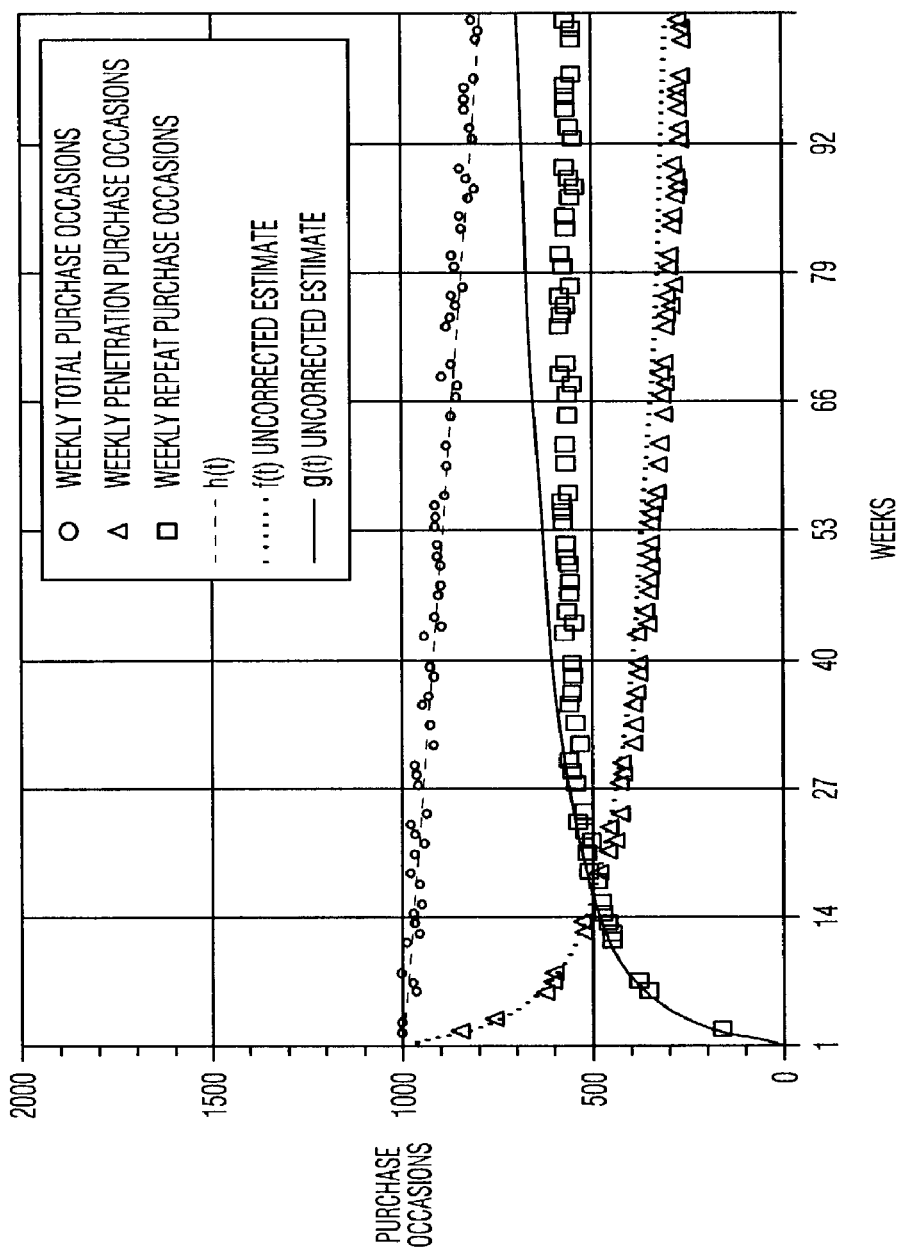
FIG. 11 is a graph mapping un-adjusted first and second curvilinear functions to the received product purchase data of FIG. 10, according to an embodiment of the present invention.

FIG. 11 is a graph mapping un-adjusted first and second curvilinear functions (f(t) and g(t)) to the received product purchase data of FIG. 10, according to an embodiment of the present invention. As in earlier embodiments, the set of computer executable instructions are operable for graphing a first curvilinear function to the graphically displayed incremental product penetration purchase data points by applying the function $f(t)=s\times t^B$ or $f(t)=s\times(m+t)^B$. Again, the translation parameter (m) will shift the curvilinear function along the second axis of the graphical display. FIG. 11 illustrates the mapped first curvilinear function to the graphically displayed incremental product penetration purchase data points as a dotted line. The set of computer executable instructions are further operable for graphing a second curvilinear function to the graphically displayed incremental product repeat purchase data points. According to the teachings of the present invention, the computer executable instructions map the second curvilinear function by applying the function relationship $g(t)=h(t)-f(t)$ to the graphically displayed incremental product repeat purchase data points. Alternatively expressed, the set of computer executable instructions map the second curvilinear function by applying the functional relationship $g(t)=s-(s\times(t))^B$ or $g(t)=s-(s\times(m+t)^B)$. FIG. 11 illustrates the second curvilinear function mapped to the graphically displayed incremental product repeat purchase data points as a solid line.

The set of computer executable instructions are operable for determining an expression, for j(t) associated with time increments by applying the function $h(t)=s+j(t)$, using curve fitting techniques, to the graphically displayed total incremental product purchase occasion data points. As shown in FIG. 11, the computer executable instructions have also graphed a line representing h(t), the incremental total purchase occasions, to the received set of purchase data. As shown in FIG. 11, the graph of h(t) provides a good fit to the data, but the un-adjusted first and second curvilinear functions, f(t) and g(t), do not provide a good fit to the data in the dynamic case.

In the static case, the initial solutions for f(t) and g(t) would provide a good fit to the set of received purchase data for the incremental penetration purchase occasions and the incremental repeat purchase occasions. Thus, in the static case, an analyst could stop at this point. In the dynamic case, it is necessary to produce adjusted functions f'(t) and g'(t) which properly account for the changing value of h(t). In other words, the initial solutions for f(t) and g(t) are those dictated by the static case. Ordinarily, the computer executable instructions would solve f(t) directly by curve-fitting a function of the form specified in connection with FIGS. 8 and 9 to the incremental penetration observed in the sample of "off-air" weeks. However, in the dynamic case this is difficult or impossible.

According to the dynamic embodiments of the present invention, the computer executable instructions can solve for what f(t) and g(t) would have been if total incremental purchase occasions remained constant at their initial value, s. The computer executable instructions can then adjust the initial solutions for f(t) and g(t) to account for subsequent changes in h(t). This approach makes use of the fact that the functions f(t) and g(t) will reach identical values, e.g. $f(t)=g(t)$, at $t_{crit}$. Since initially f(t) is solved according to $f(t)=s\times t^B$, or $f(t)=s\times(m+t)^B$, and g(t) is initially solved for $g(t)=s-(s\times t^B)$ or $g(t)=s-(s\times(m+t)^B)$, then at $t_{crit}$, $s\times t^B=s-(s\times t^B)$ or $s\times(m+t)^B=s-(s\times(m+t))^B$. Here, the computer executable instructions can solve for $t^B$ as $t^B=\frac{1}{2}$, e.g. $\frac{1}{2}$ of a product purchase cycle. The computer executable instructions resolve the $t_{crit}$ by analyzing the received purchase data.

In the dynamic case, the remaining step is to then adjust f(t) and g(t) for the observed difference from the static case; that is, the extent to which h(t) departs from s. This can be done by partitioning the difference h(t)−s between incremental product penetration purchases, represented as triangles in FIG. 10 and incremental product repeat purchases, represented as squares in FIG. 10, based on the expected ratio between the two at a given time increment. Taking the s value as the total incremental purchase occasions, the B value can be determined according to B=log (½)/log($t_{crit}$) as described above. With these values and the functions f(t) and g(t), the f(t) and g(t) functions can be adjusted as follows.

According to the teachings of embodiments of the present invention, the computer executable instructions are operable for defining a function (f'(t)), in the dynamic case, representing an adjusted expected value function for incremental product penetration purchases. According to the teachings of the present invention, the computer executable instructions are operable for defining f'(t) as f'(t)=f(t)+[h(t)−s]×f(t)/[f(t)+g(t)]. The computer executable instructions are operable for defining a function (g'(t)), in the dynamic case, representing an adjusted expected value function for incremental product repeat purchases. According to the teachings of embodiments of the present invention, the computer executable instructions are operable for defining g'(t) as g'(t)=g(t)+[h(t)−s]×g(t)/[f(t)+g(t)].

In the invention, the computer executable instructions are further operable for mapping f'(t) to the graphically displayed incremental product penetration purchase data points, and mapping g'(t) to the graphically displayed incremental product repeat purchase data points.

Figure 12:
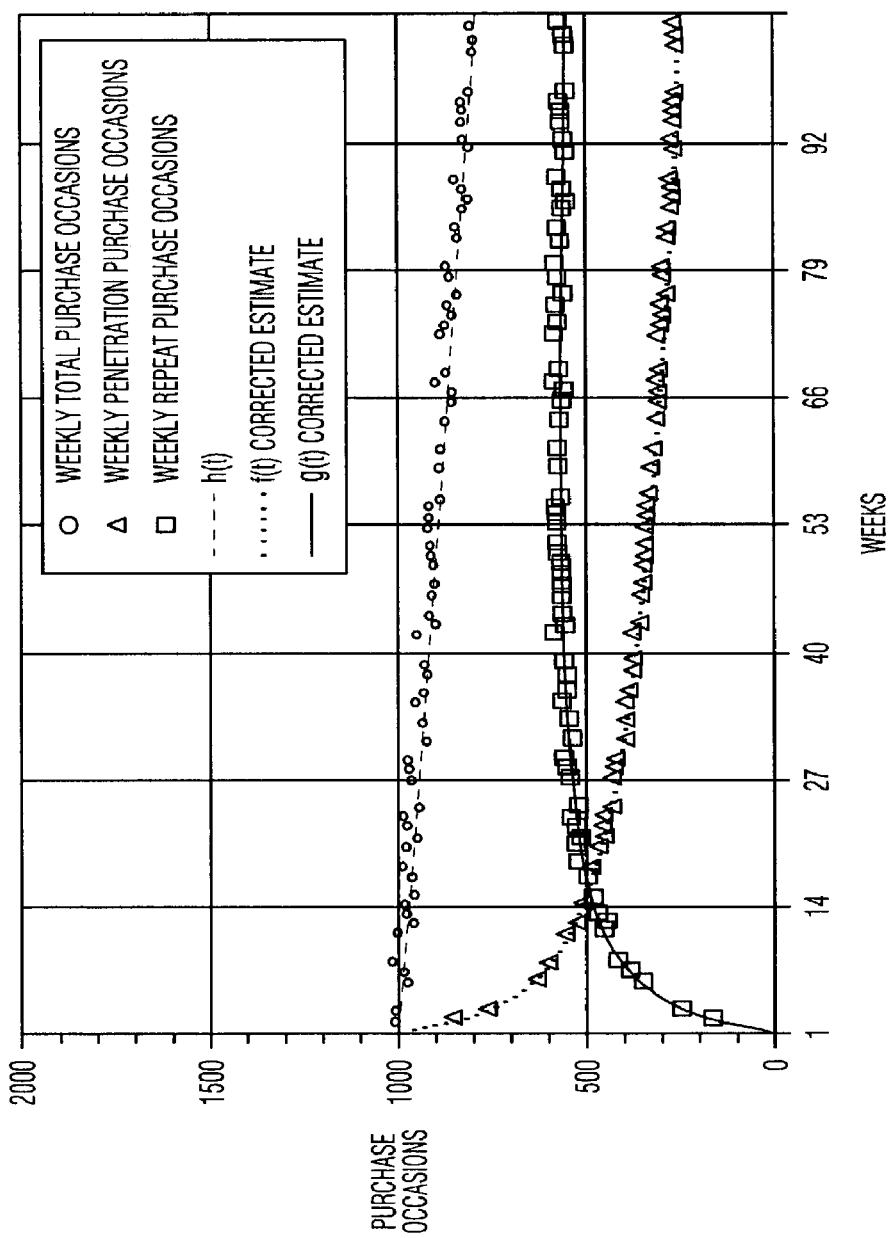
FIG. 12 is a graph mapping an adjusted first and an adjusted second curvilinear function to the received product purchase data of FIG. 10, according to an embodiment of the present invention.

FIG. 12 is a graph mapping an adjusted first and an adjusted second curvilinear function, f'(t) and g'(t) respectively, to the received product purchase data of FIG. 10, according to an embodiment of the present invention.

Whatever shortfall or excess that exists in incremental total product purchase occasions is split between incremental product penetration purchase occasions and incremental product repeat purchase occasions in proportion to their relative sizes at any given time increment (t). FIG. 12 illustrates that the adjusted first and second curvilinear functions, f'(t) and g'(t), as mapped to the received product purchase data of FIG. 10 exhibit considerable fidelity to the product purchase data. As such, the graphical display of the adjusted first and second curvilinear functions, f'(t) and g'(t), as mapped to the received product purchase data, e.g. shown as a dotted line and a solid line respectively in FIG. 12, will provide a predicated, or expected, volume of product penetration purchases and product repeat purchases at a subsequent point in time based on a previously received set of purchase data, e.g. representing non-promotional, non-advertising, "off-air" time increments.

As one of ordinary skill in the art will appreciate upon reading this disclosure, the graphical display of the adjusted first and second curvilinear functions, f'(t) and g'(t), as mapped to the received product purchase data, e.g. shown as a dotted line and a solid line respectively in FIG. 12, also provides a useful tool for analyzing the effectiveness of advertising or promotional activities in subsequent, or later, time increments. That is, the graphical display of the adjusted first and second curvilinear functions, f'(t) and g'(t), as mapped to the received product purchase data will provide a visual and quantifiable comparison between the predicated, or expected, volume of product penetration purchases and product repeat purchases at a subsequent point in time to the actual incremental product penetration and repeat purchase data received at the subsequent point in time when advertising and/or promotions are being run/ "aired". Modeling and predicting product volume penetration using the computer executable instructions defined herein is remarkably accurate for all values of t.

To further illustrate the impact of the invention two examples are now discussed in greater detail. A first example is discussed in connection with FIGS. 10-12. The example embodiment of FIG. 10 illustrates a study of a declining product. That is, FIG. 10 illustrates received data points for incremental product penetration purchase occasions, incremental repeat purchase occasions, and incremental total purchase occasions, during non-promotional, non-advertising, "off-air" time increments, for a product X. As can be seen from the data in FIG. 10, the total incremental purchase occasions for product X are shrinking rather rapidly.

At the start of the data analysis, e.g. week 1, product X is selling at a rate of about 1000 units a week. However, this figure falls to fewer than 900 units/week at the end of one year, e.g. week 52, and falls further to fewer than 800 units/week at the end of the second year, e.g. week 104.

According to the teachings provided above, the computer executable instructions provide an initial solution for h(t) where j(t) is expressed as a function of time increments. One such solution, as provided for the data in FIG. 11 is h(t)=s+ j(t), where j(t) is equal to −2t. As described above, an s value is equal to the initial total purchase occasion value. As shown in FIG. 11, the graphically mapped function h(t) as calculated by the computer executable instructions provides an excellent fit to the received total incremental product purchase occasion data. In the example, the set of computer executable instructions resolve a $t_{crit}$ value from the point in time (t) where the received data points for incremental product penetration purchase occasions and the received data for incremental repeat purchase occasions cross. In the embodiment shown in FIGS. 10-12, these data points cross at approximately 16 weeks. Therefore, a $t_{crit}$ value is 16. Next, the computer executable instructions resolve a value for B according to B=log(½)/log($t_{crit}$). In this example, the computer executable instructions resolve that a B value equals −0.25 for the product. The B value and s value can be stored and re-applied by the computer executable instructions for determining f(t), g(t), f'(t) and g'(t) as the same have been described in detail above. Since for relatively small time increments, the scaling factor (s) is equivalent to the initial total purchase occasions, e.g. 1000, f(t) can be expressed as f(t)=1000$t^{-0.25}$ and g(t) can be expressed as g(t)=1000−f(t).

FIG. 11 illustrates a graphically mapped un-adjusted first and second curvilinear functions, f(t) and g(t). FIG. 11 illustrates that the initial functions f(t) and g(t) mapped using the computer executable instructions of the present invention do not provide a best fit to the received set of purchase data in a dynamic case.

However, the set of computer executable instructions are operable to calculate adjusted function values f'(t) and g'(t) in the dynamic case as has been described in detail above. Thus, in the embodiment example of FIGS. 10-12, the computer executable instructions are operable for determining f'(t) as f'(t)=f(t)+[h(t)−s]×f(t)/[f(t)+g(t)]. Using the data of FIGS. 10-12, $$f'(t)=1000t^{-0.25}+(1000-2t-1000)\times 1000t^{-0.25}/[1000t^{-0.25}+1000-1000t^{-0.25}]=1000t^{-0.25}-2t\times t^{-0.25}.$$

Likewise, the computer executable instructions are operable for determining g'(t) as g'(t) g(t)+[h(t)−s]×g(t)/[f(t)+g(t)]. Using the data of FIGS. 10-12, $$g'(t)=1000-1000t^{-0.25}-2t\times(1-t^{-0.25})$$

FIG. 12 illustrates that the adjusted first and second curvilinear functions, f'(t) and g'(t), as mapped to the received product purchase data of FIG. 10 exhibit considerable fidelity to the product purchase data. As such, the graphical display of the adjusted first and second curvilinear functions, f'(t) and g'(t), as mapped to the received product purchase data, e.g. shown as a dotted line and a solid line respectively in FIG. 12, will provide a predicated, or expected, volume of product penetration purchases and product repeat purchases at a later point in time based on a previously received set of purchase data, e.g. representing non-promotional, non-advertising, "off-air" weeks.

Figure 13:
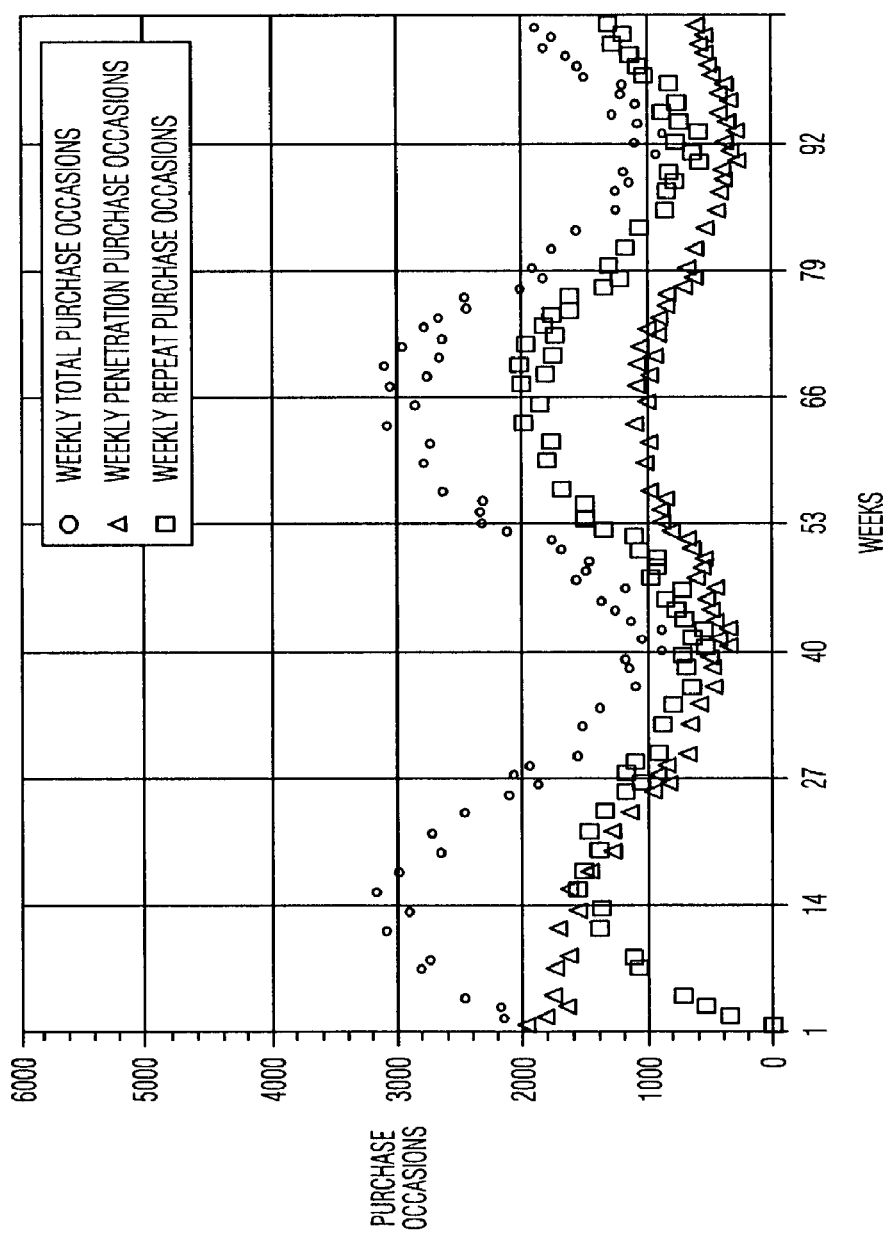
FIG. 13 is a graph plotting received product purchase data in purchase occasions versus time for a product having a cyclical purchase volume according to one embodiment of the present invention.

In a second illustrative example of the present invention, a cyclical or seasonal product product Y is modeled according to the aspects of the present invention. Examples of cyclical or seasonal products include ice cream, batteries and suntan lotion just to name a few. FIG. 13 is a graph plotting received product purchase data in occasions versus time increments for a product having a cyclical purchase volume according to one embodiment of the present invention. As shown in the embodiment of FIG. 13, product Y has sales which are high in some months, e.g. the warmer months, and much slower in others, e.g. in the winter months. As FIG. 13 illustrates, the computer executable instructions are operable for receiving a set of purchase data. The set of purchase data can be collected from any number of sources, as described herein, and includes information on incremental product repeat purchases, on incremental product penetration purchases, and on total incremental product purchase occasions. The computer executable instructions are operable for graphically displaying the information on incremental product repeat purchases, the information on incremental product penetration purchases, and the information on total incremental product purchase occasions as data points representing a volume of incremental product repeat purchases, incremental product penetration purchases, and total incremental product purchase occasions measured on a first axis versus time increments (t) measured on a second axis.

FIG. 13 is a graph plotting received product purchase data in volume versus time increments for a product having a non-constant rate of purchase, e.g. the dynamic case, according to one embodiment of the present invention. In the embodiment shown in FIG. 13 a product is experiencing a seasonal or cyclical volume in incremental total purchase occasions. In the embodiment shown in FIG. 13, a value for total incremental product purchase occasions is represented by data points in the geometric form of a circle. The incremental total product purchase occasions represent a sum for a given time increment of both the first product purchase (product penetration) by each household or single entity and the total incremental product repeat purchase occasions (the first repeat purchase and subsequent repeat purchases) by each household or single entity. In the embodiment shown in FIG. 13, the product penetration purchase data is represented by data points in the geometric form of a triangle and the product repeat purchase data is represented by data points in the geometric form of a square. As one of ordinary skill in the art will appreciate upon reading this disclosure any suitable representation for distinguishing between a given class of data points can be used.

From the received set of purchase data, the computer executable instructions are operable for determining a time increment critical value ($t_{crit}$) at which the incremental product repeat purchase data points, represented as squares in FIG. 13, and the incremental product penetration purchase data points, represented as triangles in FIG. 13, cross. As described in detail above, the computer executable instructions are operable for determining a B value by using ($t_{crit}$) In various embodiments, the computer executable instructions determine the B value according to a function B=log (½)/log($t_{crit}$). In the embodiment of FIG. 13, the incremental product repeat purchase data points, represented as squares in FIG. 13, and the incremental product penetration purchase data points, represented as triangles in FIG. 13, cross at approximately 16 weeks. Therefore, $t_{crit}$ has a value of 16 and the B value is B=−0.25.

Figure 14:
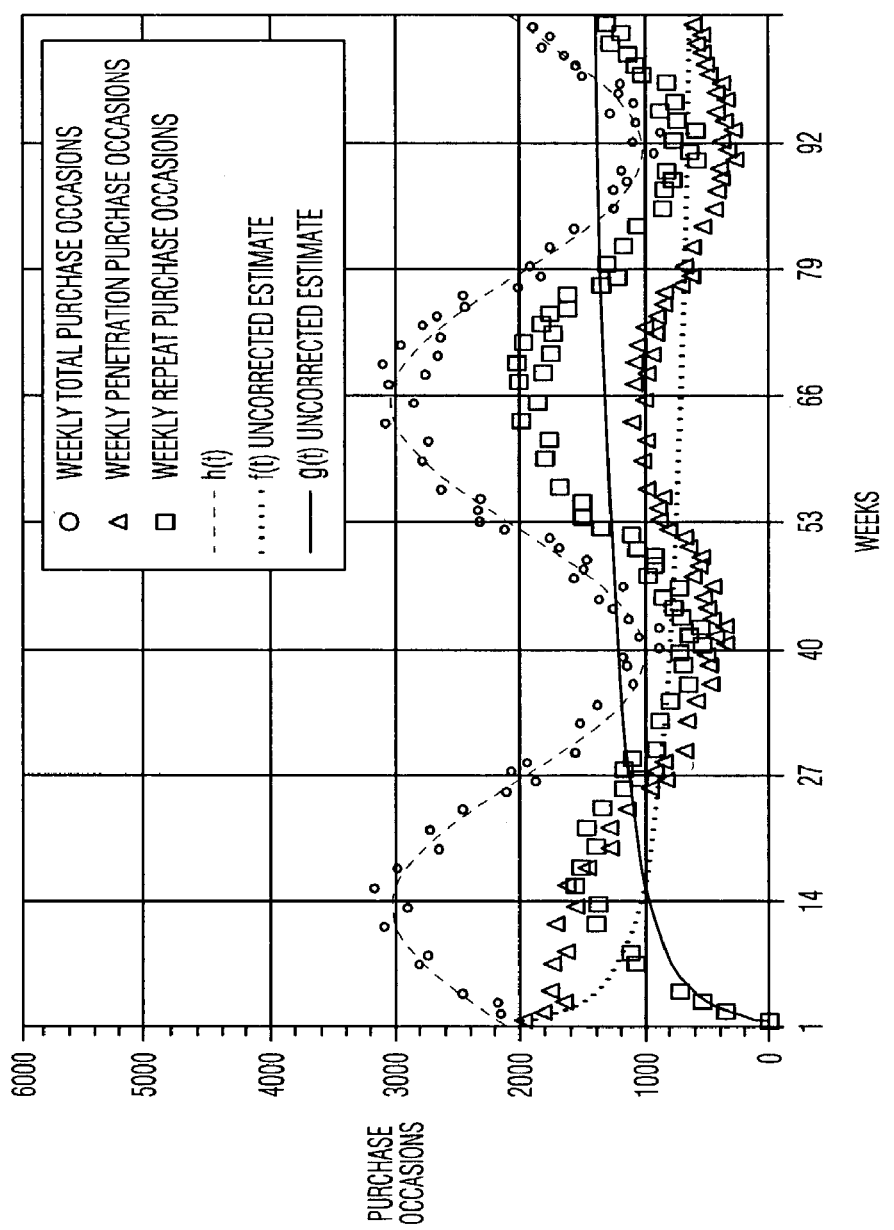
FIG. 14 is a graph mapping un-adjusted first and second curvilinear functions to the received product purchase data of FIG. 13, according to an embodiment of the present invention.

FIG. 14 is a graph mapping un-adjusted first and second curvilinear functions, f(t) and g(t), to the received product purchase data of FIG. 13, according to an embodiment of the present invention. As in earlier embodiments, the set of computer executable instructions are operable for graphing a first curvilinear function, f(t), to the graphically displayed incremental product penetration purchase data points by applying the function f(t)=s×$t^B$ or f(t)=s×$(m+t)^B$. Again, the translation parameter (m) will shift the curvilinear function along the second axis of the graphical display. FIG. 14 illustrates the mapped first curvilinear function to the graphically displayed incremental product penetration purchase data points as a dotted line. The set of computer executable instructions are further operable for graphing a second curvilinear function, g(t), to the graphically displayed incremental product repeat purchase data points. According to the teachings of the present invention, the computer executable instructions map the second curvilinear function by applying the function relationship g(t)=h(t)−f(t) to the graphically displayed incremental product repeat purchase data points. Alternatively expressed, the set of computer executable instructions map the second curvilinear function by applying the functional relationship g(t)=s−(s×$t^B$) or g(t)−s×$(m+t)^B$. FIG. 14 illustrates the second curvilinear function mapped to the graphically displayed incremental product repeat purchase data points as a solid line.

The set of computer executable instructions are operable for determining an expression for j(t) associated with time increments by applying the function h(t)=s+j(t), using curve fitting techniques, to the graphically displayed total incremental product purchase occasion data points. As shown in FIG. 14, the computer executable instructions have also graphed a line representing h(t), the incremental total purchase occasions, to the received set of purchase data. As shown in FIG. 14, the graph of h(t) provides a good fit to the data, but the unadjusted first and second curvilinear functions, f(t) and g(t), do not provide a good fit to the data in the dynamic case.

The computer executable instructions analyze and determine from the received product purchase data (for seasonal product Y) that the incremental total product purchase occasions follow an oscillating pattern with a 52 week period. The computer executable instructions analyze and determine that a mean purchase rate across a 104 week analytic period is approximately 2000 occasions per week. The overall rate of sale does not appear to be increasing or decreasing, but merely varying with the time of year. In the seasonal or cyclical case, the computer executable instructions use the mean purchase rate as the scaling factor (s) representing the product size.

Using the set of computer executable instructions, according to the teachings of the present invention, j(t) is defined as X sin(2πxt/52). h(t) is then defined as h(t)=s+1000 sin(2πxt/52). In this embodiment, the mean purchase rate across the period being analyzed is used for as the scaling factor. That is, the s value is taken as equal to 2000 and the X value is the total purchase occasions at the start of a period, e.g. in FIG. 13 X=1000.

The set of computer executable instruction is operable to define, calculate and map adjusted first and second curvilinear functions, f'(t) and g'(t) according to the functions discussed in detail above. In this embodiment, the computer executable instructions have resolved s to be approximately 2000, X=1000, and j(t) to be an oscillating function across a given period in the form X sin(2πxt/52).

Accordingly, an initial function f(t) can be expressed as $f(t)=2000t^{-0.25}$, and the initial function g(t) can be expressed as $g(t)=2000-2000t^{-0.25}$.

According to the aspects of the present invention, the computer executable instructions define the function h(t) as h(t)=2000+1000 sin(2πxt/52).

The set of computer executable instructions are operable to calculate adjusted function values f'(t) and g'(t) in the dynamic case as has been described in detail above. Thus, in the embodiment example of FIGS. 13-15, the computer executable instructions are operable for determining f'(t) as f'(t)=f(t)+[h(t)−s]×f(t)/[f(t)+g(t)]. Using the data of FIGS. 13-14, $$f'(t)=2000t^{-0.25}+(2000+1000 \ \sin(0.12083\times t)-2000)\times f(t)/[f(t)+g(t)]=2000t^{-0.25}+1000 \ \sin(0.12083\times t)\times t^{-0.25}.$$

Likewise, the computer executable instructions are operable for determining g'(t) as g'(t)=g(t)+[h(t)−s]×g(t)/[f(t)+g(t)]. Using the data of FIGS. 13-14, $$g'(t)=2000-2000t^{-0.25}+(2000+1000 \ \sin(0.12083\times t)-2000)\times g(t)/[(f(t)+g(t)]$$

$$g'(t)=2000-2000t^{-0.25}+1000 \ \sin(0.12083\times t)\times (1-t^{-0.25}).$$

Figure 15:
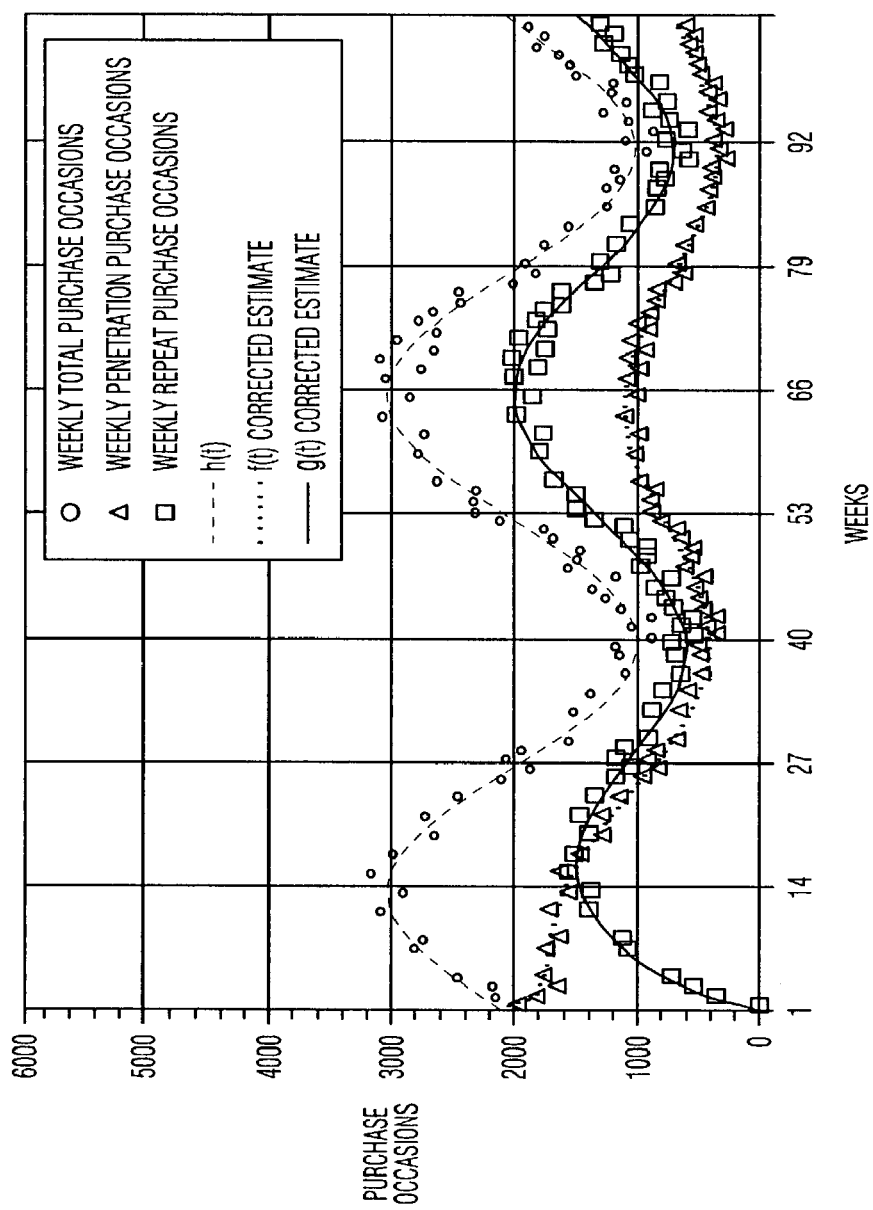
FIG. 15 is a graph mapping an adjusted first and an adjusted second curvilinear function to the received product purchase data of FIG. 13, according to an embodiment of the present invention.

FIG. 15 illustrates that the adjusted first and second curvilinear functions, f'(t) and g'(t), as mapped to the received, cyclical or seasonal product purchase data of FIG. 10 exhibit considerable fidelity to the product purchase data. As such, the graphical display of the adjusted first and second curvilinear functions, f'(t) and g'(t), as mapped to the received product purchase data, e.g. shown as a dotted line and a solid line respectively in FIG. 15, will provide a predicated, or expected, volume of product penetration purchases and product repeat purchases at a later point in time based on a previously received set of purchase data, e.g. representing non-promotional, non-advertising, "off-air" weeks.

CONCLUSION

The procedures described above are those used to form predictions or expected values for Penetration and Repeat for all time increments during the analytical period, based on time increments in which there was little or no marketing activity. Actual performance during time increments in which there was marketing activity can then be compared to the expected values for no activity, and an estimate of marketing effectiveness calculated thereby. Usually this takes the form of a simple ratio, with actual performance divided by expected. This provides an easy-to-understand explanation of the effects of different marketing events for example, "advertising made product penetration increase twice as fast as it did with no advertising".

What is claimed is:

1. A system for modeling product volume penetration, comprising:
   a server including a database having one or more client files, wherein each client file includes one or more products, and wherein the one or more client files are displayable on a remote client having a graphical user interface;
   an input device coupled to the remote client and on-line to the server; and
   a set of computer executable instructions operable on the system for projecting product penetration of one or more products in a client file over a period of time based on a set of received purchase data for a product, the set of computer executable instructions operable for:
      retrieving a set of first purchase data points for the product from the set of received purchase data, wherein each data point includes information on a unit value as well as a time increment (t) associated with the unit value;
      displaying the set of first purchase data points in a graph of the unit value versus the time increment; and
      fitting a curve to the displayed set of first purchase data points according to a function expressed $f(t)=s\times t^B$, wherein fitting the curve to the displayed set of first purchase data points provides an s value and a B value, and wherein a t value is defined as the time increment for each data point and wherein the s value is a scaling factor proportional to a volume of sales; and wherein the B value is a degree value for a belly of the curve.

2. The system of claim 1, wherein the unit value is selected from the group of an absolute number of first time sales for the product and as a percentage of all sales for the product.

3. The system of claim 1, wherein the s value represents a scaling factor that is proportional to a brand size for a product and the B value represents a value that is variable from one brand to a next brand depending on a product purchase cycle.

4. The system of claim 2, wherein the B value has a value in the range of −0.25 to −0.75.

5. The system of claim 1, wherein the set of computer executable instructions are further operable for storing and reapplying the s value and the B value according to the function $f(t)=s\times t^B$ in order to provide one or more predicted first purchase data points at a number of time increments greater than the time increments contained in the received set of purchase data.

6. The system of claim 1, wherein the set of computer executable instructions are further operable for analyzing and quantifying a difference between actual received first purchase data points in comparison to the one or more predicted first purchase data points.

7. The system of claim 1, wherein the product is selected from the group of a single brand, a brand in a specific packaging size, a brand in a particular sub-class, and a class of products.

8. A system for modeling product penetration, comprising:
   a server including a database having one or more client files, wherein each client file includes one or more products, wherein each client file includes a number of linked screen displays which are displayable on a remote client having a graphical user interface, the remote client operably connected to the server;

an input device operably connected to the remote client;

at least one of the number of linked screen displays including a data field for entering a parameter for an analysis of a client file; and a set of computer executable instructions operable on the system for projecting product penetration at a selectable point in time based on a set of received purchase data for a product, the set of computer executable instructions operable for:

receiving the set of purchase data;

graphically displaying the set of purchase data as data points representing a volume of first time product sales versus a time increment;

mapping a curvilinear function to the graphically displayed set of purchase data by applying a function expressed as $f(t)=s \times t^B$, wherein a t value is the time increment associated with each data point; and wherein mapping a curvilinear function by applying the function $f(t)=s \times t^B$ provides an s value that is proportional to a brand size for a product, and provides a B value that is variable from one brand to a next brand depending on a product purchase cycle.

9. The system of claim 8, wherein the B value a value in the range of −0.25 to −0.75.

10. The system of claim 8, wherein the set of computer executable instructions are further operable, in applying the function $f(t)=s \times t^B$, for adding a selectable translation parameter (m) to the curvilinear function such that the applied function becomes $f(t)=s \times (m+t)^B$, wherein a m value will shift the curvilinear function along an x-axis of the graphical display, wherein the x-axis represents the time increment.

11. The system of claim 10, wherein the time increment is a time increment expressed in weeks from a product launch.

12. The system of claim 11, wherein the selectable translation parameter (m) is −0.5 for time increments less than 2 weeks such that the applied function becomes $f(t)=s \times (t-\frac{1}{2})^B$.

13. A system for modeling product volume penetration, comprising:

a server including a database having one or more client files, wherein each client file includes one or more products, and wherein the client files are displayable on a remote client having a graphical user interface;

an input device coupled to the remote client and on-line to the server; and a set of computer executable instructions operable on the system for projecting product total repeat of one or more products in a client file at designated time increments based on a set of received purchase data for a product having a stable period to period purchasing, the set of computer executable instructions operable for:

defining a function (h(t)) representing total incremental product purchase occasions, wherein h(t) equals a constant (s) representing the stable period to period purchasing of the product;

defining a function (g(t)) representing incremental product repeat purchases;

defining a function (f(t)) representing incremental product penetration purchases, wherein defining the function f(t) includes defining the function as $f(t)=s \times t^B$, wherein an s value is a scaling factor that is proportional to a product size, a t value is a time increment, and a B value is associated with a product purchase cycle, wherein the set of computer executable instructions derive the function $f(t)=s \times t^B$, from a function $f(t)=s \times (m+t)^B$, wherein a m value is a selectable translation parameter; and defining a function relationship between the functions h(t), g(t) and f(t) as g(t)=h(t)−f(t).

14. The system of claim 13, wherein the set of computer executable instructions are further operable for;

receiving the set of purchase data, wherein the set of purchase data includes information on incremental product repeat purchases, on incremental product penetration purchases, and on total incremental product purchase occasions;

graphically displaying the information on incremental product repeat purchases, the information on incremental product penetration purchases, and the information on total incremental product purchase occasions as data points representing a volume of incremental product repeat purchases, incremental product penetration purchases, and total incremental product purchase occasions measured on a first axis versus associated time increments measured on a second axis;

mapping a first curvilinear function to the graphically displayed incremental product penetration purchase data points by applying the function $f(t)=s \times (m+t)^B$ to the incremental product penetration data points, wherein the translation parameter (m) will shift the first curvilinear function along the second axis of the graphical display; and mapping a second curvilinear function to the graphically displayed incremental product repeat purchase data points by applying the function relationship g(t)=h(t)−f(t), wherein $g(t)=s-(s \times (m+t)^B)$.

15. The system of claim 14, wherein the first and the second mapped curvilinear functions cross one another on the graphical display for a particular time increment ($t_{crit}$) and are mirror-symmetrical around a line y=s/2.

16. The system of claim 15, wherein the particular time increment ($t_{crit}$) at which the first and the second mapped curvilinear functions cross provides a direct indication of a product purchase cycle.

17. The system of claim 15, wherein the set of computer executable instructions are operable in one mode to determine the B value using the particular time increment ($t_{crit}$) value and resolving for the B value according to a function $B=\log(\frac{1}{2})/\log(t_{crit})$.

18. The system of claim 14, wherein mapping a second curvilinear function to the graphically displayed incremental product repeat purchase data points by applying the function relationship g(t)=h(t)−f(t), wherein $g(t)=s-(s \times (m+t)^B)$, provides a predicted volume of product repeat purchases at a time increment later than the time increments associated with the set of received purchase data points.

19. The system of claim 18, wherein the set of computer executable instruction are further operable for receiving and graphically displaying actual incremental product repeat purchase data points for purchased data received at a subsequent point in time, and wherein the graphical display of the mapped second curvilinear function provides a visual and quantifiable comparison between the predicated volume of product repeat purchases at the subsequent point in time to the actual incremental product repeat purchase data points received at subsequent point in time such that an efficacy of advertising can be assessed.

20. The system of claim 14, wherein the set of computer executable instructions are operable to apply a m value of −0.5 when all time increments associated with the set of received purchase data are less than 5 weeks from a product launch such that mapping the second curvilinear function to the graphically displayed incremental product repeat purchase data points includes mapping by applying the function relationship $g(t)=s-(s\times(t-\frac{1}{2})^B)$.

21. The system of claim 14, wherein the set of computer executable instructions are operable to iteratively and independently solve for the s value and the B value using curve fitting techniques applied to the graphically displayed incremental product repeat purchase data points for a particular product.

22. The system of claim 21, wherein the set of computer executable instructions are operable to record and reapply the s value and the B value for the particular product in subsequent calculations once the s value and the B value have been determined.

23. A system for partitioning product first repeat, comprising:
   a server including a database having one or more client files, wherein each client file includes one or more products, and wherein the client files are displayable on a remote client having a graphical user interface;
   an input device coupled to the remote client and on-line to the server; and
   a set of computer executable instructions operable on the system for determining product first repeat for one or more products in a client file at designated time increments based on a set of received purchase data for a product having a stable period to period purchasing, the set of computer executable instructions operable for:
      receiving the set of purchase data for the product, wherein the set of received purchase data includes information on a product purchase frequency distribution, including one or more incremental product repeat purchase volume data points and one or more incremental product penetration purchase volume data points, wherein each data points includes a time increment associated therewith;
      calculating a mean (u) for the product purchase frequency distribution from the received data;
      determining a received data; parametric q value by iteration using an equation $u=-q/(1-q)\times \ln(1-q)$; and
      partitioning the incremental product repeat purchase volume into a volume of first repeat purchases and a volume of subsequent repeat purchases by defining a function for repeat purchases ($p_r$), the function $p_r=-q^r/r\times \ln(1-q)$, wherein an r value represents a number of purchases by a single entity at associated time increments, and wherein for a first repeat purchase by the single entity r=2.

24. The system of claim 23, wherein the set of computer executable instructions are further operable for graphically displaying the volume of first repeat purchases and the volume of subsequent repeat purchases as data points at associated time increments.

25. The system of claim 24, wherein the set of computer executable instruction are further operable to apply curve fitting techniques to the graphically displayed volume of first repeat purchase data points and to the graphically displayed volume of subsequent repeat purchase points over a period of time increments for a particular product in order to predict a volume of first repeat purchases and a volume of subsequent repeat purchases a later point in time.

26. A system for modeling product volume penetration, comprising:
   a server including a database having one or more client files, wherein each client file includes one or more products, and wherein the client files are displayable on a remote client having a graphical user interface;
   an input device coupled to the remote client and on-line to the server; and
   a set of computer executable instructions operable on the system for projecting product volume penetration for one or more products in a client at designated time increments based on a set of received purchase data for a product having a non-constant rate of purchase, the set of computer executable instructions operable for:
      defining a function (h(t)) representing total product purchase occasions over a period of time increments (t), wherein a value for h(t) can be increasing, decreasing and cyclical over the period of time increments, wherein defining the function h(t) includes defining the function as h(t)=s+j(t), wherein a s value is an initial value for total incremental product purchase occasions;
      defining a function (g(t)) representing incremental product repeat purchases;
      defining a function (f(t)) representing incremental product penetration purchases, wherein defining the function f(t) includes defining the function as $f(t)=s\times t^B$, wherein an s value is proportional to a product size and a B value is associated with a product purchase cycle, wherein the set of computer executable instructions derive the function $f(t)=s\times t^B$ from a function $f(t)=s\times(m+t)^B$, wherein a m value is a selectable translation parameter; and
      defining a function relationship between the functions h(t), g(t) and f(t) as g(t) h(t)−f(t).

27. The system of claim 26, wherein the set of computer executable instructions are further operable for;
   receiving the set of purchase data, wherein the set of purchase data includes information on incremental product repeat purchases, on incremental product penetration purchases, and on total incremental product purchase occasions;
   graphically displaying the information on incremental product repeat purchases, the information on incremental product penetration purchases, and the information on total incremental product purchase occasions as data points expressed in volume on a first axis and expressed in time increments on a second axis;
   determining a critical time increment value ($t_{crit}$) at which the incremental product repeat purchase data points and the incremental product penetration purchase data points cross;
   determining a B value using ($t_{crit}$) in a function $B=\log(\frac{1}{2})/\log(t_{crit})$.

28. The system of claim 27, wherein the set of computer executable instructions are further operable for:
   defining a function (f'(t)) representing an adjusted expected value function for incremental product penetration purchases, wherein $f'(t)=f(t)+[h(t)-s]\times f(t)/[f(t)+g(t)]$
   defining a function (g'(t)) representing an adjusted expected value function for incremental product repeat purchases, wherein $g'(t)=g(t)+[h(t)-s]\times g(t)/[f(t)+g(t)]$.

29. The system of claim 28, the set of computer executable instructions are further operable for:
- determining an expression for j(t) associated with time increments by applying the function h(t)=s+j(t), using curve fitting techniques, to the graphically displayed total incremental product purchase occasion data points;
- mapping f'(t) to the graphically displayed incremental product penetration purchase data points; and
- mapping g'(t) to the graphically displayed incremental product repeat purchase data points.

* * * * *